(12) United States Patent
Kusawake et al.

(10) Patent No.: US 9,978,490 B2
(45) Date of Patent: May 22, 2018

(54) COMPACT, METHOD FOR PRODUCING COMPACT

(71) Applicants: Sumitomo Electric Industries, Ltd., Osaka-shi (JP); Sumitomo Electric Sintered Alloy, Ltd., Takahashi-shi (JP)

(72) Inventors: Kazushi Kusawake, Itami (JP); Masato Uozumi, Itami (JP); Atsushi Sato, Itami (JP); Koji Yamaguchi, Osaka (JP); Mamoru Ono, Itami (JP); Hiroyuki Murase, Itami (JP); Kazuo Nakamae, Itami (JP)

(73) Assignees: Sumitomo Electric Industries, Ltd., Osaka-shi (JP); Sumitomo Electric Sintered Alloy, Ltd., Takahashi-shi (JP)

( * ) Notice: Subject to any disclaimer, the term of this patent is extended or adjusted under 35 U.S.C. 154(b) by 240 days.

(21) Appl. No.: 14/735,465

(22) Filed: Jun. 10, 2015

(65) Prior Publication Data

US 2015/0279532 A1    Oct. 1, 2015

Related U.S. Application Data

(62) Division of application No. 13/984,191, filed as application No. PCT/JP2011/080392 on Dec. 28, 2011, now abandoned.

(30) Foreign Application Priority Data

Mar. 4, 2011 (JP) .................................. 2011-048381
Dec. 22, 2011 (JP) .................................. 2011-281180

(51) Int. Cl.
  *B22F 3/105*   (2006.01)
  *H01F 1/24*    (2006.01)
  (Continued)

(52) U.S. Cl.
  CPC .................. *H01F 1/24* (2013.01); *B22F 1/02* (2013.01); *B22F 3/105* (2013.01); *B22F 3/12* (2013.01);
  (Continued)

(58) Field of Classification Search
  None
  See application file for complete search history.

(56) References Cited

U.S. PATENT DOCUMENTS 5,198,159 A * 3/1993 Nakamura ............ B29C 64/135
                                                  156/273.5
5,601,662 A * 2/1997 Hirai ........................ G01L 3/102
                                                  148/100

(Continued)

FOREIGN PATENT DOCUMENTS

CN    1913993 A    2/2007
CN    101928810 A  12/2010
(Continued)

OTHER PUBLICATIONS

International Search Report in International Application No. PCT/JP2011/080392 dated Apr. 17, 2012.

(Continued)

*Primary Examiner* — Jessee R Roe
*Assistant Examiner* — Ngoclan T Mai
(74) *Attorney, Agent, or Firm* — Venable LLP; Michael A. Sartori; Kerri M. Patterson

(57) ABSTRACT

A low-loss compact and a method for producing the compact are provided.
A method for producing a compact by using coated soft magnetic powder that includes coated soft magnetic particles constituted by soft magnetic particles and insulating coatings coating outer peripheries of the soft magnetic particles includes a raw material preparation step and an
(Continued)

irradiation step. In the raw material preparation step, a raw compact is prepared by press-forming coated soft magnetic powder. In the irradiation step, part of a surface of the raw compact is irradiated with a laser. Irradiating a part of a surface of a raw compact with laser increases the number of disrupted portions of conductive portions where constituent materials of the soft magnetic particles at the surface of the raw compact have become conductive to each other, and the loss of the compact can be decreased.

7 Claims, 12 Drawing Sheets

(51) Int. Cl.

| | | |
|---|---|---|
| H01F 41/02 | (2006.01) | |
| H01F 1/33 | (2006.01) | |
| B23K 26/00 | (2014.01) | |
| H01F 3/08 | (2006.01) | |
| H02M 7/44 | (2006.01) | |
| B22F 1/02 | (2006.01) | |
| B22F 3/12 | (2006.01) | |
| H01F 37/00 | (2006.01) | |

(52) U.S. Cl.
CPC ........... *B23K 26/0081* (2013.01); *H01F 1/33* (2013.01); *H01F 3/08* (2013.01); *H01F 41/02* (2013.01); *H01F 41/0246* (2013.01); *H02M 7/44* (2013.01); *B22F 2998/10* (2013.01); *B22F 2999/00* (2013.01); *C22C 2202/02* (2013.01); *H01F 37/00* (2013.01); *Y10T 29/4902* (2015.01)

(56) References Cited

U.S. PATENT DOCUMENTS

| | | | | |
|---|---|---|---|---|
| 2001/0032684 | A1* | 10/2001 | Sakai | C21D 8/1294 148/111 |
| 2003/0077448 | A1 | 4/2003 | Ueta et al. | |
| 2003/0127157 | A1* | 7/2003 | Iyoda | B22F 1/0096 148/104 |
| 2010/0243629 | A1* | 9/2010 | Sakai | C21D 8/1294 219/121.85 |
| 2010/0323206 | A1* | 12/2010 | Soma | H01F 1/24 428/446 |
| 2011/0101262 | A1 | 5/2011 | Kuroda et al. | |
| 2012/0038449 | A1 | 2/2012 | Ogawa et al. | |
| 2012/0188049 | A1 | 7/2012 | Matsuura et al. | |
| 2014/0104023 | A1 | 4/2014 | Yang et al. | |
| 2015/0021512 | A1 | 1/2015 | Takahashi et al. | |

FOREIGN PATENT DOCUMENTS

| | | |
|---|---|---|
| EP | 2226142 A1 | 9/2010 |
| JP | 10-144512 | 5/1998 |
| JP | 2003-272910 | 9/2003 |
| JP | 2005-213621 A | 8/2005 |
| JP | 2006-229203 | 8/2006 |
| JP | 2007-090349 | 4/2007 |
| JP | 2008-195986 A | 8/2008 |
| JP | 2009-164317 | 7/2009 |
| JP | 2010-087240 | 4/2010 |
| JP | 2010-199328 A | 9/2010 |
| JP | 5027945 B1 | 9/2012 |
| WO | WO-2005/072894 A1 | 8/2005 |
| WO | WO-2006/006545 A1 | 1/2006 |
| WO | WO-2008/069749 A2 | 6/2008 |

OTHER PUBLICATIONS

Partial Supplementary European Search Report issued in European Patent Application No. 11860392.7 dated Feb. 11, 2015.
Notification of the First Office Action issued in Chinese Patent Application No. 201180069008.8 dated Apr. 23, 2015.
Chen et al., "Study on the Preparation of Fe-based Nanocrystalline Soft Magnetic Materials," Laser Technology, vol. 29, No. 1, 2005, pp. 94-97.
Notification of Reasons for Rejection in Japanese Patent Application No. 2012-118454, dated Aug. 3, 2015.

* cited by examiner (A)

2 μm (B)

100 μm (A)

2 μm (B)

20 μm (A)

2 μm (B)

100 μm (A)

(B)

(A)

2 μm (B)

100 μm

10 μm

COMPACT, METHOD FOR PRODUCING COMPACT

CROSS REFERENCE TO RELATED APPLICATIONS

This application is a Divisional of U.S. patent application Ser. No. 13/984,191, filed Aug. 7, 2013, now abandoned, which is a 371 application of International Application No. PCT/JP2011/080392, filed on Dec. 28, 2011, which claims the benefit of Japanese Patent Application Nos. 2011-048381, filed Mar. 4, 2011 and 2011-281180, filed Dec. 22, 2011.

TECHNICAL FIELD

The present invention relates to a compact obtained by pressure-forming coated soft magnetic powder, a method for producing the compact, a reactor that includes the compact, a converter that includes the reactor, and a power conversion device that includes the converter. In particular, the present invention relates to a low-loss compact and a method for producing the low-loss compact.

BACKGROUND ART

Systems that supply power to motors in hybrid cars etc., are equipped with boosting circuits. Reactors are used as one component of the boosting circuits. Reactors are configured by winding a coil on a core. In the case where a core is used under an alternating magnetic field, a loss called iron loss occurs in the core. Iron loss is roughly expressed as a sum of a hysteresis loss and an eddy-current loss and is particularly high when the core is used at high frequencies.

In order to decrease the iron loss in a reactor core, a core formed of a compact is sometimes used. A compact is formed by compressing coated soft magnetic powder that includes coated soft magnetic particles constituted by soft magnetic particles having surfaces coated with insulating coatings. Since the soft magnetic particles are insulated from one another by the insulating coatings, the compact has a particularly high effect of decreasing the eddy current loss.

A compact is prepared by filling a cavity formed by a relatively movable columnar-shaped first punch and a cylindrical die with coated soft magnetic powder and pressure-forming the coated soft magnetic powder inside the cavity with the first punch and a columnar second punch. Thus, the insulating coatings of the coated soft magnetic particles may become damaged due to the pressure applied during the pressure-forming and sliding contact with the die at the time the compact is withdrawn from the die. Damage on insulating coatings may cause exposure and stretching of the soft magnetic particles. As a result, the soft magnetic particles in the compact may become conductive to each other and form film-shaped conductive portions and the eddy current loss may increase thereby.

In order to decrease the eddy current loss, for example, Patent Literature (PTL) 1 describes treating surfaces of a raw compact formed by pressing coated soft magnetic powder (soft magnetic powder) with concentrated hydrochloric acid. To be more specific, the raw compact is immersed in concentrated hydrochloric acid to remove conductive portions on the entire surfaces of the raw compact to form a compact.

CITATION LIST

Patent Literature

PTL 1: Japanese Unexamined Patent Application Publication No. 2006-229203

SUMMARY OF INVENTION

Technical Problem

Treating the entire surfaces of the raw compact as described above can decrease the loss to a certain extent. However, although the conductive portions can be removed by treating the entire surfaces of the raw compact, there is a possibility that undamaged insulating coatings of the coated soft magnetic particles will be damaged thereby. As a result, the effect of reducing the loss may be diminished.

The present invention has been made under the above-described circumstances. One of the objects thereof is to provide a low-loss compact.

Another object of the present invention is to provide a method for producing a compact, by which a low-loss compact can be efficiently produced.

Yet another object of the present invention is to provide a compact produced by the production method of the present invention described above.

Still another object of the invention is to provide a reactor that includes the compact.

Yet another object of the present invention is to provide a converter that includes the reactor and a power conversion device that includes the converter.

Solution to Problem

The inventors of the present invention aiming to achieve the objects have carried out extensive studies on the method for producing a compact. To be more specific, compacts were produced by changing the region to be surface-treated and the cause of diminishing of the loss-reducing effect was investigated. As a result, the following findings were made.

The conductive portions that are generated in a portion (slide-contact surface) that comes into sliding contact with a die during withdrawal of the raw compact from the die are removed by treating the entire surfaces of the raw compact. Meanwhile, the conductive portions are rarely formed on the raw compact in a portion (press-contact surface) that contacts the punch and the insulating coatings are sometimes destructed by conducting the surface-treatment on that portion. Accordingly, soft magnetic particles are in an exposed state at the press-contact surface and the effect of reducing the iron loss may be diminished. It was thus found that the surface treatment is preferably conducted on part of a raw compact, in particular, a part of a slide-contact surface and more particularly a region of the slide-contact surface, the region extending in the entire length in the magnetic flux direction.

Based on these findings, the following method of performing a surface treatment on a particular region of a raw compact is the method by which a low-loss compact can be efficiently produced.

This method for producing a compact is a method for producing a compact by using coated soft magnetic powder that includes a plurality of coated soft magnetic particles constituted by soft magnetic particles and insulating coatings coating outer peripheries of the soft magnetic particles, the method including a raw material preparation step and a surface-treatment step. In the raw material preparation step, a raw compact obtained by press-forming the coated soft magnetic powder is prepared. In the surface-treatment step, the number of disrupted portions in conductive portions where constitutional materials of the soft magnetic particles on the surface of the raw compact become conductive to each other is increased. This increase in the number of disrupted portions in the conductive portions means that the number of electrically blocked portions is increased and refers to not only the case where a middle portion of a conductive portion is deformed and forms a discontinuous portion but also the case where at least part of a conductive portion is removed. The surface treatment step is performed on part of the surface of the compact. The surface-treatment step may involve any surface treatment that can increase the number of disrupted portions in the conductive portions by one or any combination of chemical, mechanical, electrical, optical, and thermal treatments. Specific examples of the mechanical treatment include cutting and polishing and examples of the thermal and optical treatment include a laser treatment. The conductive portions can be removed by any of these treatment methods. In particular, cutting or polishing will presumably remove the conductive portions by mechanically separating them. In contrast, in the laser treatment, the number of discontinuous portions presumably increases due to melting and flowing of the conductive portions.

A more specific method is the following method for producing a compact according to the present invention.

This production method is a method for producing a compact by using coated soft magnetic powder that includes a plurality of coated soft magnetic particles constituted by soft magnetic particles and insulating coatings coating outer peripheries of the soft magnetic particles, the method including a raw material preparation step and an irradiation step. In the raw material preparation step, a raw compact obtained by press-forming the coated soft magnetic powder is prepared. In the irradiation step, at least part of a surface of the raw compact is irradiated with a laser.

According to the production method of the present invention in which at least part of the surface of the raw compact is irradiated with a laser, a high energy is applied to a conductive portion having a thin-film shape or rapid heating and cooling is allowed to occur, presumably increasing the number of disrupted portions in the conductive portions. The increase in the number of disrupted portions in the conductive portions can increase the electrical resistance of the conductive portions or can block conduction in the conductive portions. As a result, the eddy current flows less easily or blocked and thus the loss of the compact can be reduced.

In addition, since at least part of a surface of a raw compact is irradiated with a laser, the possibility that the undamaged insulating coatings of the coated soft magnetic particles will be damaged decreases and the loss-reducing effect remains undiminished. As a result, a compact that exhibits a low loss comparable to that produced from a raw compact whose entire surfaces are surface-treated can be produced. Moreover, a compact having a lower loss than the compact whose loss-reducing effect has been diminished can be obtained and low-loss compacts can be produced efficiently.

Compacts produced by various production methods were also investigated. It was found that a compact obtained by the production method of the present invention in which an oxide film is present in at least part of a surface of the compact and the oxygen content in a surface portion where the oxide film is present is within a particular range exhibits a low loss. Thus, the present invention specifies a compact that has such a surface portion where the oxygen content is within a particular range.

To be more specific, the compact according to the present invention and a compact produced by the method for producing a compact according to the present invention are each formed by press-forming coated soft magnetic powder that includes a plurality of coated soft magnetic particles constituted by soft magnetic particles and insulting coatings coating outer peripheries of the soft magnetic particles. An oxide film containing iron is present in at least part of a surface of the compact. When a total content of iron and oxygen in a surface portion where the oxide film is present is assumed to be 100 mass %, an oxygen content is 9 mass % or more and 20 mass % or less.

The compact according to the present invention exhibits a low eddy current loss and low loss since the compact has the surface portion where the oxygen content is within a particular range. For example, when the compact is used as a part of a magnetic core of a reactor, a low-loss reactor can be made. Accordingly, the compact of the present invention is suitable for use in a constitutional member of a reactor and the iron loss characteristic can be improved even when the coil is excited with a high-frequency alternating current.

According to an embodiment of the production method of the present invention, the irradiation step is performed on at least part of a slide-contact surface of the raw compact, the slide-contact surface being a surface that have come into contact with a die.

With this structure, conductive portions are readily formed in the slide-contact surface contacting the die and irradiating at least part of the slide-contact surface will effectively block the eddy current.

According to another embodiment of the production method of the present invention, the irradiation step is performed on a surface of the raw compact, the surface being a surface that serves as at least part of a parallel surface parallel to a direction of a magnetic flux generated by excitation using the compact as a magnetic core.

With this structure, since the region irradiated with the laser is at least part of a surface parallel to the magnetic flux direction, the eddy current flowing in the circumferential direction about the axis in the magnetic flux direction can presumably be blocked at the region irradiated with the laser. Thus, the eddy current loss can be reduced and a low-loss compact can be produced.

According to another embodiment of the production method of the present invention, the irradiation step is performed on a surface of the raw compact, the surface being at least part of a parallel surface parallel to the direction of a magnetic flux generated by excitation using the compact as a magnetic core and being a region that extends across the entire length of the compact in the direction of the magnetic flux.

With this structure, the region irradiated with the laser is at least part of the parallel surface among the surfaces of the raw compact and is a region in the parallel surface that extends across the entire length of the compact in the magnetic flux direction. Thus, the eddy current flowing in the circumferential direction about the axis in the magnetic flux direction can be blocked across the entire length, presumably. As a result, the eddy current loss can be further reduced and a compact exhibiting a lower loss can be produced.

According to another embodiment of the production method of the present invention, the laser is one type of laser selected from a YAG laser, a $YVO_4$ laser, and a fiber laser.

When the laser is a laser selected from those described above, the number of disrupted portions in the conductive portions can be easily increased.

According to another embodiment of the production method of the present invention, the wavelength of the laser is within a wavelength absorption range of the soft magnetic particles.

According to this structure, the number of disrupted portions in the conductive portions can be easily increased and the insulating coatings of the coated soft magnetic particles in portions other than the conductive portions are less likely to be damaged.

According to anther embodiment of the production method of the present invention, when an average output of the laser is P (W) and an irradiation area of the laser is S (mm$^2$), an energy density U (W/mm$^2$)=P/S of the laser satisfies $37.0 \leq U \leq 450.0$.

According to this structure, the number of disrupted portions in the conductive portions can be assuredly increased by adjusting the laser energy density U to 37.0 W/mm$^2$ or more. Since the laser energy density U is 450.0 W/mm$^2$ or less, contact between soft magnetic particles resulting from excessive melting can be suppressed and it becomes possible to suppress diminishing of the loss-reducing effect.

According to another embodiment of the production method of the present invention, the ratio of an irradiation interval to a beam diameter of the laser is 0.35 or less.

Since the ratio is 0.35 or less, the area of the untreated region not irradiated with the laser can be reduced and thus it becomes easier to disrupt the conductive portions.

According to another embodiment of the production method of the present invention, the number of times of laser overlap is 5 or more.

Since the same region is irradiated with the laser several times as described above, the conductive portions can be more reliably disrupted.

According to an embodiment of the compact of the present invention, a portion in which an oxygen content is less than 6 mass % is also present in the surface of the compact.

With this structure, both a low-oxygen region where the oxygen content is less than 6 mass % and a high-oxygen region where the oxygen content is 9 mass % or more and 20 mass % or less are present on the surface of the compact. Even when the compact partly has a low-oxygen region, the eddy current can be blocked at the high-oxygen region. Thus, a low-loss compact can be obtained.

According to an embodiment of the compact, the oxide film has a portion having a thickness of 0.1 μm or more.

Since the oxide film has a thick portion having a thickness of 0.1 μm or more, the eddy current flows less easily at that portion when the compact is used as a part of a magnetic core of a reactor.

According to an embodiment of the compact of the present invention, a disrupted region and a gathered portion are present. The disrupted region is present in at least part of a surface of the compact and electrically disrupts adjacent soft magnetic particles from each other. The gathered portion is present on a surface of the soft magnetic particle adjacent to the disrupted region, does not bridge between the adjacent particles, and is constituted by an oxide film that is thicker at a central portion than at an outer peripheral portion.

With this structure, when the compact is used as a part of a magnetic core of a reactor, the eddy current can be disrupted at the disrupted region and the gathered portion.

Since the adjacent soft magnetic particles are electrically disrupted at this disrupted region and the gathered portion is present on the particle adjacent to the disrupted region, not only insulation between the particles but also the insulation of the surface of the compact can be reliably achieved.

According to another embodiment of the compact of the present invention, a disrupted region and an aggregated portion may be present. The disrupted region is present in at least part of a surface of the compact and electrically disrupts adjacent soft magnetic particles from each other. The aggregated portion is present on a surface of the soft magnetic particle adjacent to the disrupted region, protrudes toward an outer peripheral side of the soft magnetic particle, and locally has a large thickness. The oxide film is present in at least part of the aggregated portion.

With this structure, for example, when the compact is used as a part of a magnetic core of a reactor, the eddy current can be disrupted at the disrupted region and the aggregated portion. Since the adjacent soft magnetic particles are electrically disrupted at this disrupted region and the end portions of the disrupted portion are covered with insulating oxide films, particles can be more reliably insulated from each other.

When the compact of the present invention has the aggregated portion according to an embodiment, the oxide film in the aggregated portion has a portion that has a thickness of 0.5 μm or more.

Since the aggregated portion has a portion that has a thickness of 0.5 μm or more as described above, for example, the eddy current flows less easily at that portion when the compact is used as a part of a magnetic core of a reactor.

According to an embodiment of the compact of the present invention, the oxide film contains at least one selected from FeO, α-Fe$_2$O$_3$, γ-Fe$_2$O$_3$, and Fe$_3$O$_4$.

When a compact containing the above-described compound is used, a low-loss reactor is obtained as shown in Test Examples below.

According to an embodiment of the compact of the present invention, a density d of the compact is 7.0 g/cm$^3$ or more.

With this structure, a compact yields a high magnetic flux density.

According to an embodiment of the compact of the present invention, the soft magnetic particles are composed of iron having a purity of 99 mass % or higher.

With this structure, the compact can yield high permeability and magnetic flux density.

A reactor of the present invention includes a coil formed by winding a wire and a magnetic core that is arranged on an outer side and an inner side of the coil and forms a closed magnetic circuit. At least part of the magnetic core is formed of a compact, and the compact is the compact according to the present invention.

The reactor of the present invention is a low-loss reactor since a compact having an excellent loss-reducing effect is included.

The reactor of the present invention is suitable for use in a constitutional member of a converter. A converter of the present invention includes a switching element, a drive circuit configured to control operation of the switching element, and a reactor configured to smoothen the operation of the switching element, the converter converting an input voltage by operation of the switching element. This reactor is the reactor according to the present invention. The converter according to the present invention is suitable for use in a constitutional member of a power conversion device. A power conversion device according to the present invention includes a converter configured to covert an input voltage and an inverter that is connected to the converter and performs conversion between DC and AC, the power conversion device being configured to drive a load by using power converted by the inverter. This converter is the converter according to the present invention.

With this structure, since the magnetic core includes the reactor of the present invention formed of a low-los compact, the magnetic core exhibits low loss and is suitable for use in vehicle parts etc.

Advantageous Effects of Invention

A method for producing a compact according to the present invention can reduce the eddy current loss and can efficiently produce a low-los compact.

A compact according to the present invention is a low-loss compact that exhibits a low eddy current loss.

A reactor according to the present invention exhibits a low loss.

DESCRIPTION OF EMBODIMENTS

Figure 1:
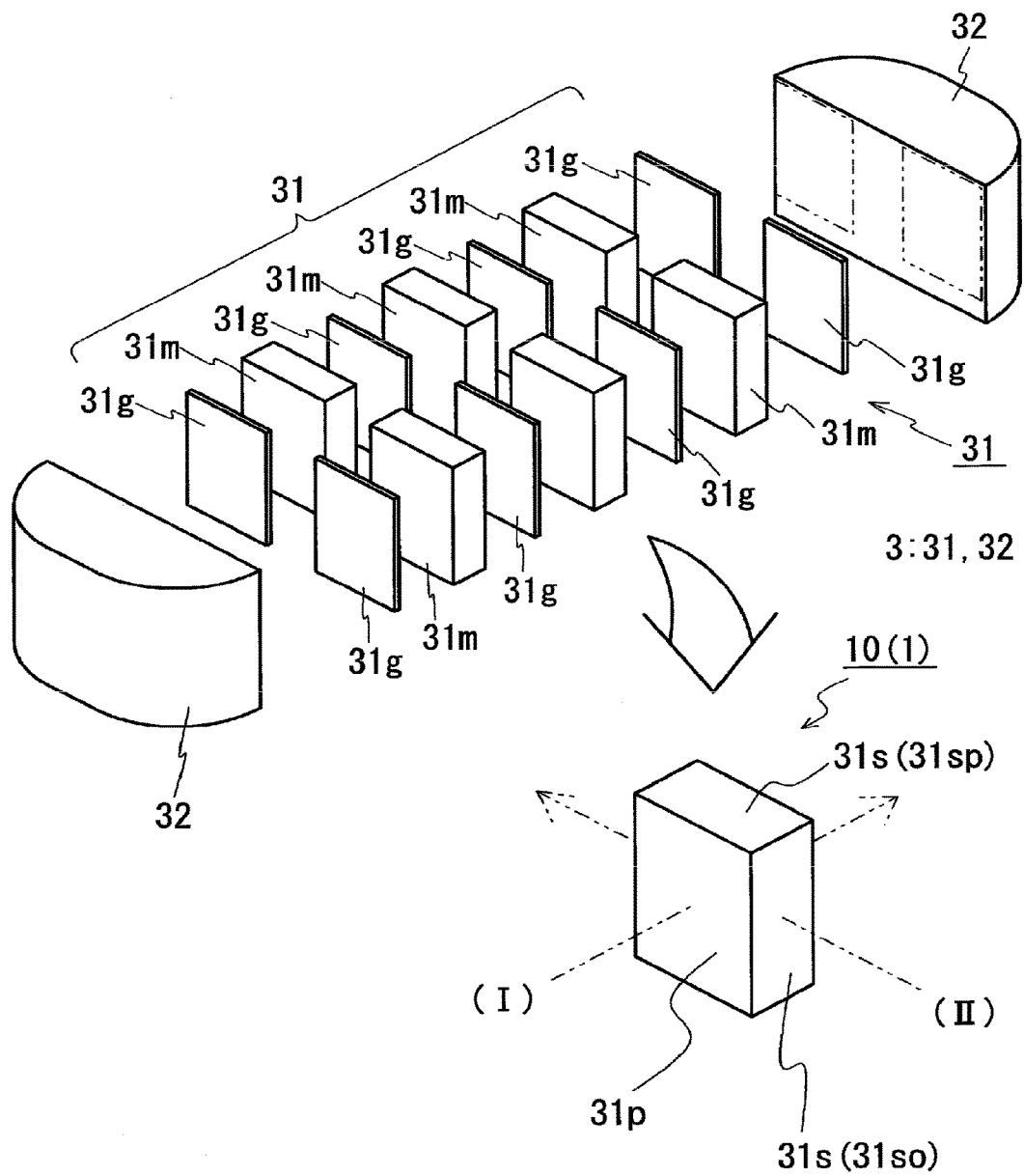
FIG. 1 is a diagram showing a compact according to a first embodiment and is an exploded perspective view of a reactor core equipped with the compact.

Embodiments of the present invention will now be described. First, a compact and a method for producing the compact are described and then a reactor that includes the compact, a converter that includes the reactor, and a power conversion device are described.

First Embodiment

<<Compact>>

A compact according to the present invention is obtained by pressure-forming coated soft magnetic powder that contains a plurality of coated soft magnetic particles each constituted by a soft magnetic particle having an outer periphery coated with an insulating coating and an iron-containing oxide film is present in at least part of a surface of the compact. The feature of the compact is that a particular amount of oxygen is contained in the surface portion where the oxide film is present. In the detailed description below, this feature is mainly described and the structure of the soft magnetic powder is described in the subsequent description of the production method. The constitutional elements of the compact substantially retain the characteristics and properties of ingredients.

An iron-containing oxide film is present in at least part of a surface of the compact. Assuming that the total content of iron and oxygen in the surface portion of the compact where the oxide film is present is 100 mass %, the oxygen content is 9 mass % or more. In this manner, when the compact is used as a reactor core, for example, the eddy current can be disrupted or flows less easily at the portion where the oxide film is formed. Accordingly, the eddy current loss can be reduced and a low-loss reactor can be configured. The surface portion refers to a region from the compact surface to a depth of about 1 μm toward the inner side of the compact. The oxygen content refers to a value observed in this region. The oxygen content is measured by, for example, energy dispersive X-ray spectroscopy (EDX). The upper limit of the oxygen content is 20 mass % or less. At such an oxygen content, the loss can be sufficiently reduced.

The surface of the compact may include a portion where the oxygen content is less than 6 mass %. In other words, a low-oxygen region where the oxygen content is less than 6 mass % and a high-oxygen region where the oxygen content is 9 to 20 mass % are present in the surface of the compact. These two regions can be formed by partly irradiating the surface of the compact with a laser. The region not irradiated with the laser in the surface of compact forms a low-oxygen region.

The mechanism with which the oxide film is formed is believe to be as follows. At a surface of the compact, a conductive portion that bridges between coated soft magnetic particles is formed as the surface makes a sliding contact against a die in a forming step described below. The conductive portion is formed when a metal portion of a particular soft magnetic particle a makes sliding contact with a die and spreads in a direction opposite to the direction in which the formed product is pulled out from the die and forms a thin-film portion that hangs over a soft magnetic particle β adjacent to the soft magnetic particle α. The surface of the compact is then irradiated with a laser to melt the conductive portion. The melted conductive portion flows toward the respective particle sides so as to form a disrupted region between the two particles. As a result, the portion where the bridge established by the conductive portion between the adjacent soft magnetic particles α and β is disrupted forms a disrupted region.

Thick aggregated portions are locally formed when the energy density U of the laser is low. An aggregated portion is formed when a melted metal solidifies by localizing on the adjacent soft magnetic particle β side before the melted metal gathers to the surface of the soft magnetic particle α integrally connected to the thin film-shaped conductive portion. The aggregated portion protrudes from the surface of the soft magnetic particle α toward the outer peripheral side of the particle α and sometimes hangs over the surface of the adjacent soft magnetic particle. The aggregated portions are often formed in a band shape. As the conductive portion melts, the conductive portion having electrical conductivity is electrically disrupted and an insulating oxide film is formed in at least part of the aggregated portion. Accordingly, the particles can be more reliably insulated from one another. At the same time, oxide films are also formed on the remaining parts of the surface other than the aggregated portions of the soft magnetic particles having the aggregated portions. The aggregated portions sometimes have thicker oxide films than those formed on the parts of the surface other than the aggregated portions of the soft magnetic particles that have aggregated portions.

At a higher energy density U of the laser, the melted conductive portion flows more extensively and the melted metal moves toward the center of each particle to minimize the surface area due to surface tension. As a result, a gathered portion which does not bridge between adjacent particles and constituted by an oxide film that is thicker in the central portion than in the outer peripheral portion is formed on each particle surface. This gathered portion is formed by the melted metal that has solidified after it gathered on the soft magnetic particle α. The gathered portion is usually planar and close to a disk in shape. In other words, the portion that had formally been a conductive portion turns into an oxide film. In contrast, if the conductive portion does not melt and thus does not flow despite laser irradiation, an oxide film is formed on the film-shaped conductive portion as is. If oxidation proceeds further, the entire conductive portion turns into an oxide film.

Oxide films are sometimes formed only on individual particle surfaces and, in other times, are formed bridging between adjacent particles. Both of the former and the latter are formed on the surface of the compact in some cases and only one of the former and the latter is formed on the surface of the compact in other cases. In the former case, oxide films are scattered on the surface of the compact. The former state is readily generated as the energy density U of the laser is increased.

The oxide film preferably has a portion where the thickness is 0.1 μm or more. In this manner, the eddy current can be disrupted or flows less easily at the thick portion. The oxide film preferably has a thick portion where the thickness is 0.5 μm or more, 1 μm or more, 3 μm or more, 5 μm or more, 7 μm or more, and further more preferably 10 μm or more. The thickness of the oxide film can be determined by cross-section observation of a compact with a scanning electron microscope (SEM), for example.

The composition of the oxide film preferably contains at least one compound selected from FeO, α-$Fe_2O_3$, γ-$Fe_2O_3$, and $Fe_3O_4$. Particularly preferably, large quantities of FeO and $Fe_3O_4$ are contained. A low-loss reactor can be formed by using a compact that includes the above-described oxide film as the constitutional part of the reactor. The composition of the oxide film can be detected by X-ray diffraction (XRD), for example.

A disrupted region that electrically disrupts between adjacent soft magnetic particles is present in at least part of the surface of the compact. In this manner, when the compact is used as a reactor core and excitation is conducted, the eddy current flowing in the surface of the compact in the circumferential direction can be disrupted at this disrupted region. The gathered portion is present on at least one of the surfaces of soft magnetic particles adjacent to the disrupted region. In other words, the gathered portion is formed on the surface of an individual particle. The aggregated portion may be present on a surface of a soft magnetic particle adjacent to the disrupted region. The aggregated portion in some cases is formed as the conductive portion stretched from plural soft magnetic particles is melted and then integrally aggregated. Accordingly, there may be two or more particles that have aggregated portions. The aggregated portion includes, for example, a portion where the thickness of the oxide film is 0.5 μm or more. In some cases, gathered portions and aggregated portions are scattered on the surface of the compact.

[Density]

The density d (g/cm$^3$) of the compact is preferably high. At a high density, a compact exhibits a high magnetic flux density. In particular, the density d is 7.0 g/cm$^3$ or more. The upper limit of the density d is 7.55 g/cm$^3$. This is because the insulation between soft magnetic particles may be degraded at an excessively high density d.

<<Method for Producing Compact>>

The compact according to the present invention described above may be produced by the following production method of the present invention, for example. The production of the compact of the present invention involves a method for producing a compact by using coated soft magnetic powder, the method including a raw material preparation step and an irradiation step. First, a step of preparing coated soft magnetic powder, which is a constituent material of the compact, is described and then the above-described steps are described.

[Raw Material Preparation Step]

In the raw material preparation step, coated soft magnetic powder that constitutes a compact is prepared and press-formed to form a raw compact or a raw compact that has been formed in advance is obtained by purchasing or the like. In the former case, an ingredient preparation step and a raw material forming step of forming a raw compact from the ingredients are included. In the ingredient preparation step, coated soft magnetic powder that constitutes a compact is prepared. The coated soft magnetic powder includes plural coated soft magnetic particles having outer peripheries coated with insulating coatings.

[Ingredient Preparation Step]

In the ingredient preparation step, coated soft magnetic powder is prepared. In this step, soft magnetic particles having a composition described below may be obtained by making or purchasing and then outer peripheries of the soft magnetic particles may be coated with insulating coatings having a composition described below to prepare coated soft magnetic powder. Alternatively, coated soft magnetic powder produced in advance may be purchased. In the former case, if soft magnetic particles are to be made, coated soft magnetic powder can be produced through a method for producing soft magnetic particles described below and a method for coating the particles with insulating coatings.

(Soft Magnetic Particles)
<Composition>
Soft magnetic particles preferably contain 50 mass % or more of iron, for example, pure iron (Fe). Alternatively, at least one selected from iron alloys, e.g., Fe—Si-based alloys, Fe—Al-based alloys, Fe—N-based alloys, Fe—Ni-based alloys, Fe—C-based alloys, Fe—B-based alloys, Fe—Co-based alloys, Fe—P-based alloys, Fe—Ni—Co-based alloys, and Fe—Al—Si-based alloys can be used. In particular, pure iron having an iron content of 99 mass % or more and particularly preferably 99.5 mass % or more is preferably used from the viewpoints of permeability and magnetic flux density.

<Particle Size>
The average particle size of soft magnetic particles may be any size that contributes to reducing the loss in the compact. In other words, the average particle size is not particularly limited and may be appropriately selected. For example, the average particle size may be 1 μm or more and 150 μm or less. When the average particle size of the soft magnetic particles is 1 μm or more, the increase in coercive force and in hysteresis loss of the compact made from the soft magnetic powder can be suppressed without degrading the flowability of the soft magnetic particles. The average particle size of the soft magnetic particles is limited to 150 μm or less to effectively reduce the eddy current loss that occurs in a high-frequency region of 1 kHz or higher. The average particle size of the soft magnetic particles is more preferably 40 μm or more and 100 μm or less. As long as the lower limit of the average particle size is 40 μm or more, the effect of reducing the eddy current loss can be obtained and the handling of the coated soft magnetic powder is facilitated. Thus, a compact having a higher density can be obtained. The average particle size refers to a particle size at which the total of the masses of particles from the small size side reaches 50% of the total mass of all particles in a particle size histogram, in other words, a 50% particle size.

<Shape>
The shape of the soft magnetic particles preferably has an aspect ratio of 1.2 to 1.8. This aspect ratio is the ratio of the largest diameter to the smallest diameter of a particle. Soft magnetic particles having an aspect ratio within this range will increase the demagnetization factor once formed into a compact and a compact having excellent magnetic properties can be obtained compared to when soft magnetic particles having a small aspect ratio (close to 1.0) are used. Moreover, the strength of the compact can be improved.

<Production Method>
Soft magnetic particles are preferably produced by an atomizing method such as a water atomizing method or a gas atomizing method. Soft magnetic particles produced by a water atomizing method have many irregularities on the particle surfaces and thus a high-strength compact is easily obtained as the irregularities interlock. In contrast, soft magnetic particles produced by a gas atomizing method are favorable in that the particle shape is substantially spherical and irregularities that penetrate the insulating coatings are few.

(Insulating Coatings)
Insulating coatings cover the outer peripheries of the soft magnetic particles to insulate between adjacent soft magnetic particles. Covering the soft magnetic particles with the insulating coatings suppresses contact between the soft magnetic particles and maintains the relative permeability of the compact to a low level. Moreover, due to the presence of the insulating coatings, the eddy current is suppressed from flowing between the soft magnetic particles and the eddy current loss of the compact can be decreased.

<Composition>
The insulating coatings may be any coatings having a sufficient insulating property to ensure insulation between the soft magnetic particles. Examples of the material for the insulating coatings include phosphate salts, titanate salts, silicone resins, and a double layer material containing a phosphate and a silicone resin.

In particular, insulating coatings formed of phosphate salts have excellent deformability. Thus, during the process of pressurizing a soft magnetic material to form a compact, the insulating coatings can follow the deformation of the soft magnetic particles and can also undergo deformation. Phosphate salt coatings have high adhesion to soft magnetic particles and thus do not easily detach from the soft magnetic particles surfaces. Examples of the phosphate salts include metal phosphate compounds such as iron phosphate, manganese phosphate, zinc phosphate, calcium phosphate, and aluminum phosphate.

Insulating coatings formed of a silicone resin have high heat resistance and thus do not decompose easily in the heat treatment step described below. Thus, the insulation between the soft magnetic particles can be satisfactorily maintained up to completion of production of the compact.

When the insulating coatings have a double layer structure that includes a phosphate and a silicone resin, the phosphate is preferably positioned on the soft magnetic particle side and the silicone resin is preferably disposed directly on the phosphate. Since the silicone resin is directly disposed on the phosphate, the properties of both the phosphate and the silicone resin can be exhibited.

<Coating Thickness>
The average thickness of the insulating coatings may be any as long as adjacent soft magnetic particles can be insulated from one another. For example, the average thickness is preferably 10 nm to 1 μm. When the thickness of the insulating coatings is 10 nm or more, the contact between the soft magnetic particles can be suppressed and the energy loss caused by the eddy current can be effectively suppressed. When the thickness of the insulating coatings is 1 μm or less, the percentage of the insulating coatings in the coated soft magnetic particles is prevented from becoming excessively high and thus the magnetic flux density of the coated soft magnetic particles is prevented from decreasing excessively.

The thickness of the insulating coatings can be measured as follows. First, the coating composition obtained from compositional analysis (transmission electron microscope energy dispersive X-ray spectroscopy (TEM-EDX)) and the amounts of elements determined by inductively coupled plasma-mass spectrometry (ICP-MS) are used to determine an equivalent thickness. Then the coatings are directly observed through a TEM image to confirm that the order of the equivalent thickness determined in advance is an appropriate value and the value determined as such is assumed to be the average thickness.

<Coating Method>
The method for coating soft magnetic particles with insulating coatings may be appropriately selected. For example, the particles may be coated by conducting hydrolysis or condensation polymerization. Soft magnetic particles and ingredients of insulating coatings are blended and the resulting blend is mixed under heating. As a result, the soft magnetic particles can be sufficiently dispersed in the ingredients of the coatings and thus outer sides of the individual soft magnetic particles can be coated with the insulating coatings.

The heating temperature and the mixing time may be appropriately selected. The heating temperature and the mixing time are selected to more sufficiently disperse the soft magnetic particles so that it becomes easier to coat individual particles with insulating coatings.

[Raw Material Forming Step]

In the raw material forming step, coated soft magnetic powder that includes coated soft magnetic particles prepared in the ingredient preparation step described above is pressure-formed to form a raw compact.

In the raw material forming step, typically, coated soft magnetic powder is injected into a forming mold constituted by punches and a die having particular shapes and compacted under pressure. The coated soft magnetic powder is pressure-formed so as not to cause seizure of the formed product on the die by pressure or breaking of the insulating coatings of the coated soft magnetic powder during use of the punches and die. Examples of the method therefor include an outer lubrication forming method in which a lubricant is applied onto at least one of the punches and die in a portion (inner wall) that comes into contact with the coated soft magnetic powder and then the coated soft magnetic powder is pressurized, and an inner lubrication forming method in which a mixture of coated soft magnetic powder and a lubricant prepared in advance is pressurized in the die. In the former method, the lubricant is applied to the inner wall and thus the friction with the coated soft magnetic powder can be decreased and a high-density compact can be formed. In the latter method, the lubricant adhering to the surfaces of the coated soft magnetic powder decreases the friction between the particles of the coated soft magnetic powder and thus breaking of the insulating coatings of the coated soft magnetic particles can be suppressed.

Examples of the lubricant include solid lubricants such as metal soaps such as stearic acid and lithium stearate, aliphatic acid amides such as stearic acid amide, and higher aliphatic acid amides such as ethylene bisstearic acid amide; dispersions of solid lubricants in liquid media such as water; liquid lubricants; and inorganic lubricants having hexagonal crystal structures.

In applying the pressure, the forming mold may be heated in advance and then pressure-forming may be conducted. In such a case, the forming mold temperature may be 50° C. to 200° C., for example. A high-density compact can be obtained by heating the mold.

The pressure applied may be appropriately selected. For example, in order to produce a compact for use as a reactor core, the density d is preferably about 7.0 g/cm$^3$ or more. In particular, the pressure is preferably about 490 to 1470 MPa and more preferably about 590 to 1079 MPa.

As a result of pressurizing, for example, a raw compact 10 having a rectangular parallelepiped shape shown in FIG. 1 (lower right side) can be formed. The shape of the raw compact 10 can be appropriately changed by changing the shape of the mold used for pressure-forming. Examples of the shape of the raw compact 10 include, in addition to the rectangular parallelepiped shape, a prism having a trapezoidal section and a U-letter form that has a U-letter shaped surface. When the raw compact 10 has a rectangular parallelepiped shape, two end surfaces of the raw compact 10 are pressed surfaces 31p pressed with punches and the remaining four side surfaces are slide-contact surfaces 31s that make sliding contact with a die.

[Irradiation Step]

In the irradiation step, a surface of the raw compact is partly irradiated with a laser. Laser irradiation increases the number of disrupted portions where the conductive portions that make constitutional materials of plural soft magnetic particles on the surface of the raw material to be conductive to each other have been disrupted. In other words, in this irradiation step, disruption of the conductive portions is mainly performed by melting the conductive portion and allowing the melted conductive portion to flow.

Figure 2:
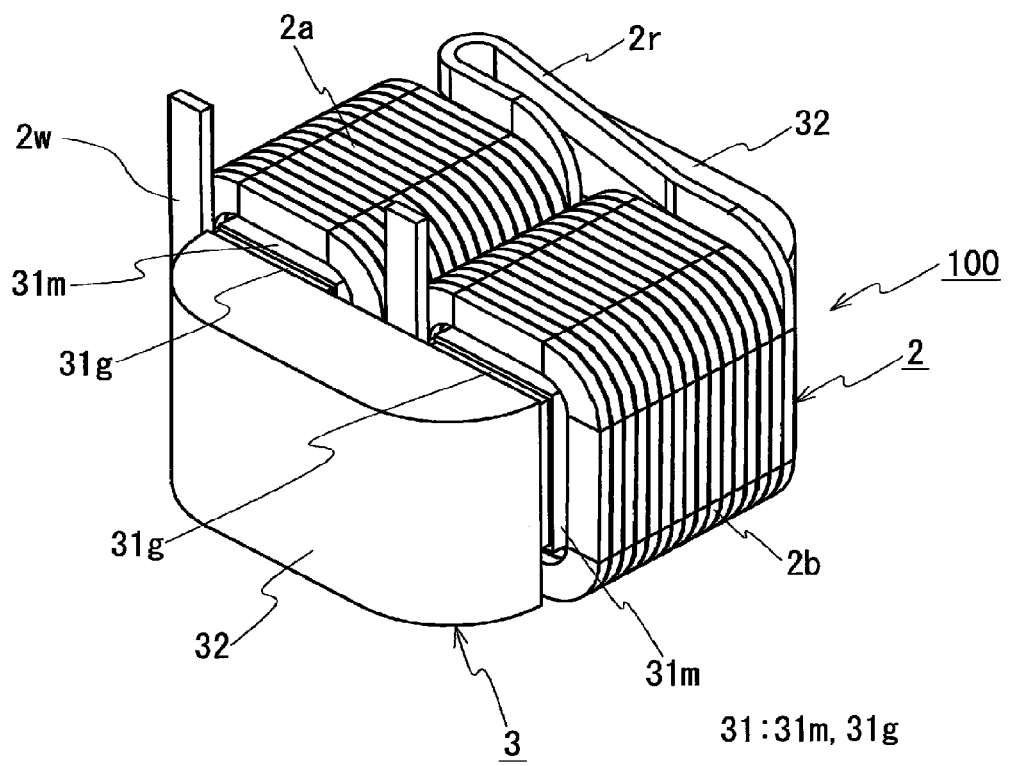
FIG. 2 is a schematic perspective view of a reactor according to a second embodiment.

The raw compact surface to which the laser is applied may be at least part of a surface that makes sliding contact with the die and that is susceptible to formation of conductive portions. The portion to be irradiated with the laser is preferably at least part of a surface (parallel surface) parallel to the magnetic flux direction when the raw compact 10 is used as a magnetic core, e.g., a reactor core 3 shown in FIG. 1 (upper side), and excitation is conducted. FIG. 1 shows one example of the reactor core 3 included in a reactor (FIG. 2). FIG. 1 is an exploded view of inner core units 31 to be covered with a coil (FIG. 2) and exposed core units 32 exposed from the coil. The inner core units 31 are configured by stacking core pieces 31m and gap members 31g. Each core piece 31m may be formed of a compact 1 obtained by irradiating the raw compact 10 with a laser, or a compact 1 subjected to laser irradiation and the heat treatment described below. When compacts 1 and a coil are used in combination and the coil is excited, a magnetic flux is formed in the compact along the axis direction of the coil. Thus, for example, as shown in FIG. 1 (lower right side), in the case where the compacts 1 and a coil are used in combination such that the direction of arrow (I) is the magnetic flux direction, that is, such that the pressed surfaces 31p pressed with the punch are surfaces (orthogonal surfaces) that orthogonally intersect the magnetic flux direction and the remaining four slide-contact surfaces 31s are parallel surfaces parallel to the magnetic flux direction, the region to be irradiated with a laser may be at least part of a surface of the raw compact 10, the surface being a surface that will constitute a parallel surface (slide-contact surface 31s). It is believed that when a part of a surface of the raw compact 10, the surface forming a parallel surface with respect to the magnetic flux direction, is irradiated with a laser, the eddy current flowing in the circumferential direction about the axis in the magnetic flux direction can be blocked at the portion irradiated with the laser. Accordingly, the eddy current loss can be reduced and a low-loss compact can be produced. In other words, as long as the region irradiated with a laser is at least a part of a surface that is a slide-contact surface 31s that comes into sliding contact with a die and will form a parallel surface described above, a low-loss compact can be effectively produced.

In contrast, in the case where the magnetic flux direction is the direction of arrow (II), that is, in the case where the pressed surfaces 31p pressed with the punch are parallel to the magnetic flux direction, the region to be irradiated with a laser may be at least part of a slide-contact surface 31 so orthogonally intersecting the magnetic flux direction. It is believed that, in this manner, since the eddy current flowing in the surface of the slide-contact surface 31 so can be blocked, the eddy current loss can be further reduced. Furthermore, at least part of a slide-contact surface 31sp parallel to the magnetic flux direction is preferably irradiated with a laser. In this manner, the eddy current in the circumferential direction about the axis in the magnetic flux direction can be blocked at the portion of the slide-contact surface 31sp irradiated with a laser.

When the raw compact has a cylindrical shape and the surfaces orthogonally intersecting the magnetic flux direction are the pressed surfaces pressed with punches, the parallel surface parallel to the magnetic flux direction is the lateral surface of the cylinder. Thus, the region to be irradiated with a laser may be at least part of the lateral surface of the raw compact.

The region to be irradiated with a laser is preferably a region in the slide-contact surface 31s, the region extending across the entire length in the punch pressing direction. In particular, the region to be irradiated with a laser is more preferably a part of a parallel surface of a raw compact, the part extending across the entire length in the magnetic flux direction. For example, when the compacts 1 and a coil are used in combination such that the magnetic flux direction is the direction of arrow (I), the region to be irradiated with a laser is preferably a part of a parallel surface of the raw compact 10, the part extending from one end surface to the other end surface. In other words, in the case where the pressed surfaces 31p pressed with the punches are surfaces (orthogonal surfaces) orthogonally intersecting the magnetic flux direction and the remaining four slide-contact surfaces 31s are parallel surfaces to the magnetic flux direction, the region to be irradiated with a laser is preferably a part of a parallel surface of the raw compact 10, the part extending across the entire length in the pressing direction (the entire length in the magnetic flux direction). It is believed that, in this manner, the eddy current that flows in the circumferential direction about the axis in the magnetic flux direction can be blocked across the entire length. In other words, a low-loss compact can be more effectively produced if the region to be surface-treated is a slide-contact surface 31s that makes sliding contact with the die, serves as a parallel surface described above, and extends across the entire length in the magnetic flux direction.

In contrast, in the case where the magnetic flux direction is the direction of the arrow (II), that is, in the case where the punch pressed surfaces 31p are the parallel surfaces to the magnetic flux direction, the region to be irradiated with a laser is a region in the slide-contact surface 31so orthogonally intersecting the magnetic flux direction, the region extending from one end surface to the other end surface, in other words, the region between long sides or short sides of the slide-contact surface 31so. It is believed that, in this manner, the eddy current flowing in the slide-contact surface 31so can be blocked. Furthermore, a region of the slide-contact surface 31sp parallel to the magnetic flux direction, the region extending across the entire length in the magnetic flux direction, is preferably irradiated with a laser. In this manner, the eddy current flowing in the circumferential direction about the axis in the magnetic flux direction can be blocked across the entire length.

When the raw compact is a cylinder and surfaces orthogonally intersecting the magnetic flux direction are the surfaces pressed with punches, the surface parallel to the magnetic flux direction is the lateral surface of the cylinder. Thus, the region to be irradiated with a laser is preferably a region in the lateral surface of the raw compact, the region extending in the entire length in the pressing direction (entire length in the magnetic flux direction).

When a region in a parallel surface, the region extending from one end surface to the other end surface, is irradiated with a laser, the total area of the parallel surface is expressed by t×l where t represents the length of the parallel surface in the direction parallel to the magnetic flux direction and l represents the entire length of the compact in the circumferential direction about the axis in the magnetic flux direction, and the region to be irradiated with the laser is expressed by t×w where w represents the treatment width, which is the width of the region in the parallel surface actually subjected to a surface treatment (width in a direction orthogonal to the magnetic flux direction). The treatment width w preferably satisfies d<w≤l where d represents the average particle size of coated soft magnetic iron-based powder. When the treatment width w is within this range, the effect of reducing the eddy current loss can be effectively obtained. More preferably, the ratio w/l of the treatment width w to the entire length l is 30% or less, yet more preferably 20% or less, still more preferably 10% or less, and most preferably 5% or less.

The type of laser may be any laser that can disrupt conductive portions at the surface of the raw compact. Specific examples thereof include solid-state lasers that use solid media in the lasers. For example, the laser may be one selected from a YAG laser, a $YVO_4$ laser, and a fiber laser. With such a laser, the conductive portions can be disrupted. These lasers may be known lasers each containing a medium doped with a variety of materials. In other words, the YAG laser may include a medium doped with Nd, Er, or the like. The $YVO_4$ laser may include a medium doped with Nd or the like. The fiber laser may include a medium, which is a fiber core, doped with a rare earth element, e.g., Yb.

The wavelength of the laser is preferably within the wavelength absorption region of the soft magnetic particles (conductive portions). In this manner, the conductive portions can be easily disrupted and removal of regions other than the conductive portions can be suppressed. The wavelength is preferably about 532 nm to 1064 nm to be more specific.

The energy density U (W/mm$^2$) of the laser is expressed by U=P/S where P (W) represents the average output of the laser and S (mm$^2$) represents the area irradiated with the laser. The energy density U preferably satisfies 37.0 W/mm$^2$≤U≤450.0 W/mm$^2$. At an energy density U of 37.0 W/mm$^2$ or more, the number of disrupted portions of the conductive portions can be reliably increased. Since the energy density U is 450.0 W/mm$^2$ or less, the contact between the soft magnetic particles caused by excessive melting can be sufficiently suppressed. The energy density U is more preferably 50.0 W/mm$^2$ or more and 300.0 W/mm$^2$ or less.

As the energy density U is increased within this range, (1) the oxide films formed can come to contain more FeO or $Fe_3O_4$ and thus the oxygen content in the surface portion can be increased, and (2) thick portions can be formed in oxide films. In particular, regarding (1), while the amounts of FeO and $Fe_3O_4$ are increased, more $Fe_3O_4$ occurs than FeO as the energy density U becomes higher. Assuming that the total content of iron and oxygen contained in the surface portion of the portion where the oxide film is formed is 100 mass %, the oxygen content can be increased to 9 mass % or more by increasing the energy density U. Within the range of the energy density U described above, the oxygen content can be about 20 mass %. Regarding (2), portions where the thickness of the oxide film is 0.1 μm or more can be formed. As the energy density U is increased, thicker portions, such as portions with thickness of 0.5 μm or more, 1.0 μm or more, 3 μm or more, 5 μm or more, 7 μm or more, and particularly 10 μm or more can be formed. Within the range of the energy density U described above, portions where the oxide films have a thickness of about 15 μm can be formed.

As illustrated in the above-described mechanism, as a result of laser irradiation, disrupted regions that electrically disrupts between adjacent soft magnetic particles can be formed in at least part of the surface of the compact irradiated with the laser. Simultaneously with formation of the disrupted regions, oxide films are formed in surface regions within surfaces of soft magnetic particles adjacent to the disrupted regions, the surface regions being positioned at a surface of the compact. When a laser having a low energy density U is applied, disrupted regions are formed and aggregated portion are formed on surfaces of soft magnetic particles adjacent to the disrupted regions. The thickness of the oxide film in an aggregated portion increases with the increasing energy density U of the laser. In contrast, when a laser having a high energy density U is applied, disrupted regions are formed and gathered portions are formed on surfaces of soft magnetic particles adjacent to the disrupted regions. In a gathered portion, the thickness of the entire oxide film can be increased and the thickness of the center portion of the oxide film can be made larger than that of the outer peripheral side as the energy density U of the laser is increased. This is because the amount of the melted metal or the flowability of the melted metal differs depending on the magnitude of the laser energy density U and thus there occurs a difference in the extent of aggregation of the constituent materials of the soft magnetic particles acting to minimize the surface tension due to surface tension.

The ratio of the irradiation interval to the beam diameter of the laser is preferably small. The beam diameter refers to a diameter of a laser on a surface of a compact. The irradiation interval refers to a distance in which a laser beam moves in a scanning direction within one pulse time of laser irradiation. When the ratio of the irradiation interval to the laser beam diameter is small, the untreated region not irradiated with a laser scanning a surface of the compact can be minimized and it becomes easier to disrupt the conductive portions. In particular, the ratio is preferably 0.35 or less and particularly preferably 0.30 or less.

The ratio of the scanning interval to the laser beam diameter is also preferably small. The scanning interval refers to a distance in which the laser travels when moving to a next line of scanning. In other words, when the ratio of the scanning interval to the beam diameter of the laser is small, the region not irradiated with the laser can be minimized and it becomes easier to disrupt the conductive portions.

The number of laser overlap is preferably 2 or more. The number of overlap refers to the number of times the same region is treated (scanned) with a laser. The number of laser overlap is preferably high. In this manner, conductive portions can be reliably disrupted. In particular, the number of overlap is 5 or more and preferably 10 or more.

The method for irradiating a surface of the raw compact with a laser may be any method capable of applying a laser to a desired position of a surface of a raw compact.

[Other Steps]
(Heat Treatment Step)

The raw compact described above may be heat-treated to remove strains and dislocations introduced to the soft magnetic particles during the raw material forming step.

The strains can be sufficiently removed when the temperature of the heat treatment is high. Thus, the heat treatment temperature is 300° C. or higher and preferably 400° C. or higher and the upper limit is preferably about 800° C. At such a heat treatment temperature, not only strain can be removed but also lattice defects such as dislocations introduced to the soft magnetic particles during pressing can be removed. As a result, the hysteresis loss of the compact can be effectively reduced.

The time of the heat treatment may be appropriately selected based on the heat treatment temperature described above and the volume of the raw compact so as to sufficiently remove the strain and/or dislocations introduced to the soft magnetic particles during the raw material forming step. For example, in the temperature range described above, the heat treatment time is preferably 10 minutes to 1 hour.

The atmosphere of the heat treatment may be air but is preferably an inert gas atmosphere. In this manner, adhesion of soot and the like produced by combustion of the lubricant to the raw compact can be suppressed.

The heat treatment step may be performed on the raw compact before the irradiation step or the raw compact after the irradiation step.

<<Advantageous Effects>>

The embodiment described above has the following effects.

(1) Since a compact in which an oxide film is present in at least part of a surface and the oxygen content of that surface portion is 9 mass % or more is used, a low-loss reactor is obtained. In the case where a compact having disrupted regions is used as a reactor core and excitation is conducted, the eddy current flowing in the circumferential direction of the surface of the compact can be disrupted or flows less easily. Accordingly, the eddy current loss can be reduced and a low-loss reactor can be formed. Thus, the compact of the present invention is suitable for use in a constitutional member of a reactor.

(2) According to the production method described above, the conductive portions are irradiated with a laser so that a high energy is imparted to the conductive portions having a thin-film shape or so that rapid heating and cooling (temperature changes) can be performed. During this process, the thin-film parts are melted, and the melted metal flows or aggregates due to the surface tension, thereby forming lumps (aggregated portions) and gathered portions as illustrated in Test Examples below. Accordingly, the conductive portions become divided and similar disruptions occur at a large number of conductive portions, thereby increasing the number of portions where the conductive portions are disrupted. Due to the increase in the number of disrupted portions of the conductive portions, the electrical resistance of the conductive portions is increased or the conduction in the conductive portions can be blocked. As a result, the eddy current flows less easily or can be blocked. Accordingly, a low-loss compact having a low eddy current loss can be produced.

(3) The compact described above or a compact produced by the production method described above are suitable for use in reactor cores. Although detailed descriptions are provided bellow, for example, in a reactor that includes a coil constituted by a pair of coil elements arranged side by side so that the axes of the coil elements are parallel to each other, and a magnetic core that includes a pair of columnar inner core units (middle core units) on which the coil elements are respectively disposed and outer core units (side core units) not provided with a coil element and connected to the inner core units to constitute a closed magnetic circuit, these compacts are suitable for use in the inner core units. In the case where the inner core units are configured as a combination of plural divided core pieces, at least one and preferably all of the divided core pieces can be constituted by the compacts of the present invention. According to this structure, the region of the inner core unit or the divided core piece to be irradiated with a laser is at least part of a surface that is parallel to the magnetic flux direction during excitation of the coil. Here, the parallel surface is a slide-contact surface that makes sliding contact with the die. When the divided core pieces are assembled into a reactor, the surfaces of the divided core pieces irradiated with the laser face the inner peripheral surface of the coil. When the coil is excited, the eddy current occurring in the circumferential direction of the inner core units can be blocked at the regions irradiated with the laser and thus the eddy current loss can be reduced. When the laser is applied to a parallel surface in the region that extends from one end surface to the other end surface of the inner core units or each divided piece and a reactor is assembled, the laser-irradiated regions extend across the entire length of the inner core unit in the magnetic flux direction. Accordingly, the eddy current can be blocked across the entire length of the inner core in the magnetic flux direction. Thus, the eddy current loss can be further decreased. The outer core units typically have an end surface having a U-letter shape or a trapezoidal shape. The compact of the present invention or the compact obtained by the production method of the present invention may be used in the outer core units as well.

(4) The portion to be surface-treated by laser irradiation is part of a surface of a raw compact. Accordingly, the treatment step and the treatment time can be shortened and the process of producing a compact can be simplified. Accordingly, the production cost for the compact can be reduced.

Second Embodiment

<<Reactor>>

The compact described above and a compact produced by the above-described method for producing a compact are suitable for use in constitutional members of reactors. For example, a reactor includes a coil obtained by winding a wire, and a magnetic core that is arranged on the inner side and the outer side of the coil and forms a closed magnetic circuit. At least part of the magnetic core is constituted by a compact. This compact may be the compact of the present invention. In other words, the feature of the reactor of the present invention is that the compact described above is used in at least part of the magnetic core of the reactor. An example of the reactor is described below with reference to FIGS. 1 and 2. The description is provided by using an example in which the compacts of the present invention are used in inner core units 31 of a magnetic core 3 of a reactor 100, the inner core units 31 being arranged on the inner side of a coil 2. Known structures of reactors can be used as the structures other than the core pieces 31m constituting the inner core units 31. Naturally, the exposed core units 32 of the reactor core 3 may be constituted by the compacts of the present invention.

(Coil)

The coil 2, as shown in FIG. 2, includes a pair of coil elements 2a and 2b formed by spirally winding a single joint-less continuous wire 2w, and a connecting part 2r that connects between the coil elements 2a and 2b. The coil elements 2a and 2b have a hollow cylindrical shape and the same number of winding turns and are arranged side by side (juxtaposed) so that the axes thereof are parallel to each other. A part of the wire 2w is bend into a U-letter shape at one end (the end on the right-hand side in FIG. 2) of the coil 2 so as to form the connecting part 2r. According to this structure, the winding directions of the coil elements 2a and 2b are the same.

A coated wire that includes a conductor composed of a conductive material such as copper, aluminum, or an alloy thereof and an insulating layer composed of an insulating material (typically, an enamel layer composed of polyamideimide or the like) on the outer periphery of the conductor is suitable for use as the wire 2w. A round wire having a circular cross section and a rectangular wire having a rectangular cross section are suitable for use as the conductor of the wire 2w. The coil elements 2a and 2b are edgewise coils obtained by edgewise-winding of a coated rectangular wire having an insulating layer.

(Magnetic Core)

The magnetic core is described with reference to FIG. 1. The magnetic core 3 includes a pair of columnar inner core units 31 covered with the coil elements 2a and 2b (FIG. 2) and a pair of exposed core units 32 not provided with the coil 2 (FIG. 2) and exposed from the coil 2. The inner core units 31 are each a columnar member (in this example, each portion has a substantially rectangular parallelepiped shape) having a contour that matches with the inner peripheral shape of the coil elements 2a and 2b. The exposed core units 32 are each a columnar member having a pair of trapezoidal surfaces. In the reactor core 3, the exposed core units 32 are arranged to sandwich the inner core units 31 arranged parallel to each other and end surfaces of each inner core unit 31 are brought into contact with the inner end surfaces of the exposed core units 32 so as to form a ring shape.

Each inner core unit 31 is a layered member formed by alternately stacking core pieces 31m composed of a magnetic material and gap members 31g composed of a material (for example, a nonmagnetic material such as alumina) having a lower permeability than the core pieces to adjust the inductance. The exposed core units 32 are also core pieces composed of a magnetic material. Integration of the core pieces and integrations of the core pieces 31m and the gap members 31g may be achieved by using an adhesive or an adhesive tape, for example.

All of the core pieces 31m of the inner core units 31 are formed of the compacts of the present invention described above. The core pieces 31m (the inner core units 31) are preferably arranged so that the regions irradiated with the laser are positioned to be parallel to the magnetic flux direction during excitation of the coil 2. In other words, when these core pieces 31m are assembled into a reactor 100, the surfaces of the core pieces 31m irradiated with the laser face the inner peripheral surface of the coil 2. In this manner, when the coil 2 is excited, the eddy current occurring in the circumferential direction of the inner core units 31 about the axis in the magnetic flux direction can be blocked at the regions irradiated with the laser and the eddy current loss can be reduced. When all of the core pieces 31m of the inner core units 31 are constituted by the core pieces 31m (compacts of the present invention) irradiated with the laser as in this example, the core pieces 31m are preferably arranged so that the regions irradiated with the laser align in the region that extends from one end surface side to the other end surface of each inner core unit 31. In this manner, when a reactor is assembled, the regions irradiated with the laser extend across the entire length of the inner core units 31 in the magnetic flux direction. Thus, the eddy current can be blocked across the entire length of the inner core units 31 in the magnetic flux direction and the eddy current loss can be further reduced.

(Other Structural Members)

In order to enhance the insulation between the coil 2 and the reactor core 3, an insulator (not shown in the drawing) composed of an insulating resin may be provided, an outer periphery of an assembly that includes the coil 2 and the reactor core 3 may be covered with an insulating resin to form an integrated member, the assembly may be housed in a casing composed of a metal material or the like, or the assembly housed in the casing may be covered with a sealing resin.

According to the above-described structure, when the inner core units 31 are constituted by the compacts described above and are arranged to be parallel to the magnetic flux direction during excitation of the coil 2, the eddy current occurring in the circumferential direction of the inner core units 31 about the axis in the magnetic flux direction can be blocked and the eddy current loss can be reduced. Thus, a low-loss reactor 100 can be provided.

Third Embodiment

<<Converter and Power Conversion Device>>

The reactor described above can be used as a constitutional part of a converter mounted in vehicles, for example, and a constitutional part of a power conversion device that includes the converter.

Figure 3:
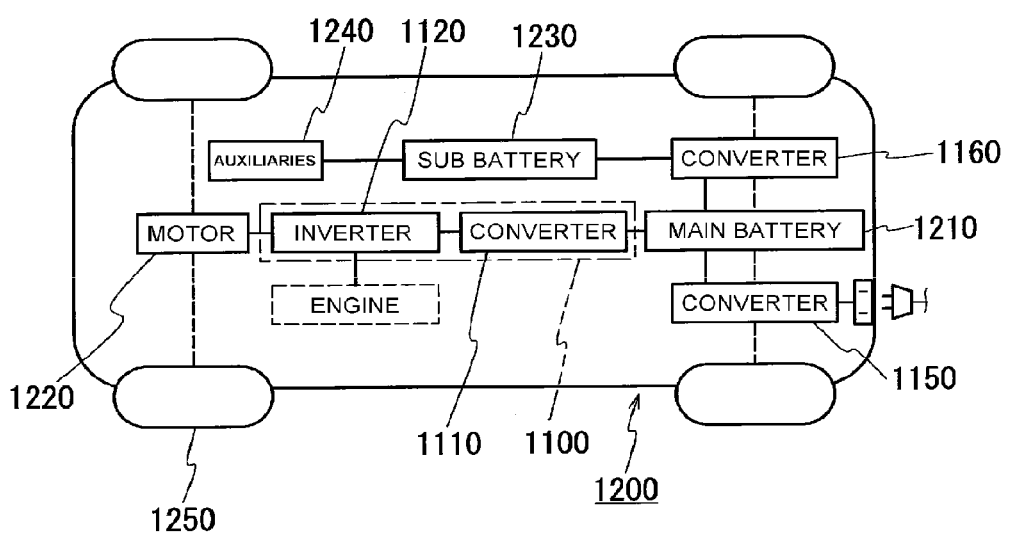
FIG. 3 is a schematic view of a power system of a hybrid car.

For example, as shown in FIG. 3, a vehicle 1200 such as a hybrid car or an electric car includes a main battery 1210, a power conversion device 1100 connected to the main battery 1210, and a motor (load) 1220 driven by power supplied from the main battery 1210 and used for driving. The motor 1220 is typically a three-phase AC motor, drives wheels 1250 during driving, and functions as a power generator during regeneration. When the vehicle 1200 is a hybrid car, an engine is provided in addition to the motor 1220. In FIG. 3, an inlet is illustrated as a portion of the vehicle 1200 at which charging is conducted. Alternatively, the vehicle 1200 may be equipped with a plug.

The power conversion device 1100 includes a converter 1110 connected to the main battery 1210, and an inverter 1120 that is connected to the converter 1110 and performs conversion between DC and AC. When the vehicle 1200 is being driven, the converter 1110 shown in this example boosts the DC voltage (input voltage) of the main battery 1210 from about 200 V to 300 V to about 400 V to 700 V and supplies the power to the inverter 1120. The converter 1110 also lowers the DC voltage (input voltage) output from the motor 1220 through the inverter 1120 during regeneration, to a DC voltage suitable for use in the main battery 1210 so as to charge the main battery 1210. When the vehicle 1200 is being driven, the inverter 1120 coverts the direct current boosted by the converter 1110 to a particular alternating current and supplies the power to the motor 1220. During regeneration, the inverter 1120 converts the AC output from the motor 1220 to a direct current and outputs the direct current to the converter 1110.

Figure 4:
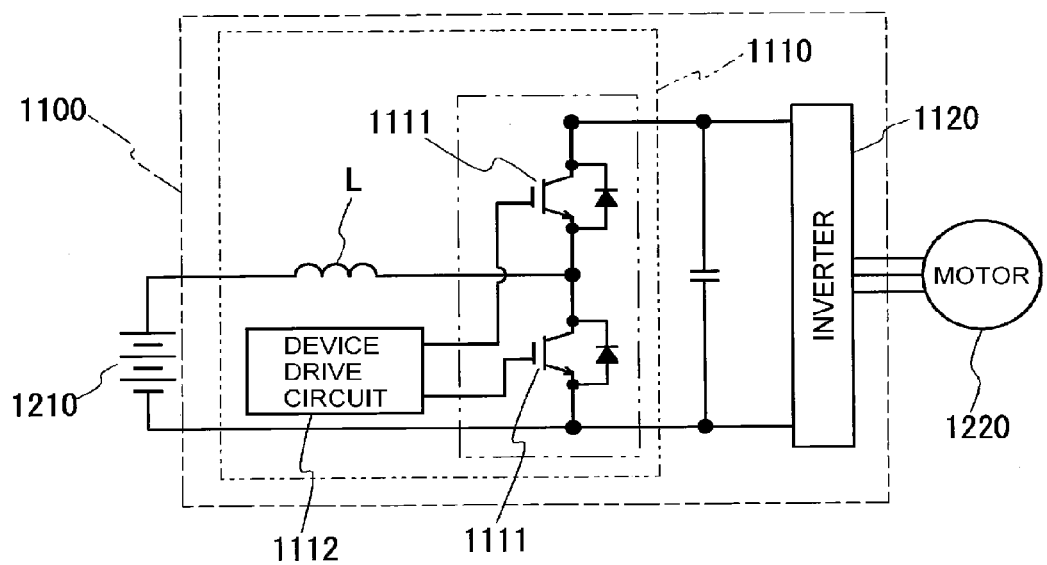
FIG. 4 is a schematic circuit diagram showing an example of a power conversion device of the present invention equipped with a converter of the present invention.

As shown in FIG. 4, the converter 1110 includes switching elements 1111, a drive circuit 1112 that controls the operation of the switching elements 1111, and a reactor L and performs conversion of input voltage (in this example, boosting and lowering the voltage) by repeating ON/OFF (switching operation). Power devices such as FETs and IGBTs are used as the switching elements 1111. The reactor L utilizes the properties of the coil of inhibiting changes in the electrical current that flows in the circuit and has a function of smoothing the changes that occur when the electric current increases or decreases by the switching operations. The reactor described above can be used as this reactor L. Since a low-loss reactor 100 is installed, the power conversion device 1100 and the converter 1110 as a whole can achieve low loss.

The vehicle 1200 includes, in addition to the converter 1110, a converter 1150 for a power supply device, the converter 1150 being connected to the main battery 1210, and a converter 1160 for auxiliaries. The converter 1160 is connected to a sub battery 1230 that powers auxiliaries 1240 and to the main battery 1210 and converts the high voltage of the main battery 1210 to a low voltage. The converter 1110 typically performs DC-DC conversion but the converter 1150 for the power supply device and the converter 1160 for supplying power to auxiliaries perform AC-DC conversion. The converter 1150 for the power supply device performs DC-DC conversion in some cases. Reactors having a structure similar to the above-described reactor with some changes in size, shape, etc., may be used as the reactors of the converter 1150 for the power supply device and the converter 1160 for supplying power to auxiliaries. The above-described reactors and the like may be used in converters that perform conversion of input power but only have a function of either boosting or lowering the voltage.

Test Example 1

In Test Example 1, compacts of samples 1-1 to 1-3 were prepared as below and the magnetic properties of the samples were tested as described below.

[Sample 1-1]

A compact of Sample 1-1 is prepared through the steps described below in the order of step a→step b→step c→step d.

Step a: Ingredient preparation step of preparing coated soft magnetic powder

Step b: Raw material forming step of pressure-forming the coated soft magnetic powder to prepare a raw compact Step c: Heat treatment step of heating the raw compact to form a heat-treated compact Step d: Irradiation step of irradiating a surface of the heat-treated compact with a laser.

(Step a)

A mixture material containing coated soft magnetic powder obtained by coating surfaces of soft magnetic particles composed of iron powder with insulating coatings composed of iron phosphate, and 0.6 mass % of a lubricant composed of zinc stearate was prepared as a constituent material for a compact. The iron powder was prepared by a water atomization method and had a purity of 99.8% or higher. The average particle size of the soft magnetic particles was 50 µm and the aspect ratio thereof was 1.2. The average particle size was determined as a particle size at which the total of the masses of particles from the small size side reaches 50% of the total mass of all particles in a particle size histogram, in other words, a 50% particle size. The insulating coatings substantially covered the entire surfaces of the soft magnetic particles and the average thickness thereof was 20 nm.

(Step b)

The mixture material prepared in step a was placed in a die having a particular shape and a pressure of 730 MPa was applied to pressure-form the material into a raw compact without heating the die. In this step, plural raw compacts having a rectangular parallelepiped shape were made.

(Step c)

The raw compacts made in step b were heat-treated in a nitrogen atmosphere at 400° C.×30 minutes to obtain plural heat-treated compacts.

(Step d)

In step d, the rectangular parallelepiped heat-treated compacts obtained in step c were combined into a ring shape to prepare a test piece for evaluating iron loss. During this step, at least one of the heat-treated compacts is irradiated with a laser. In this step, a laser was applied to a part of a surface of each heat-treated compact, the part being where a coil would be disposed for the magnetic property measurement test described below. During this laser irradiation, a region of a surface (parallel surface) that would be parallel to the direction of the magnetic flux that would occur in the sample was irradiated under the conditions described below, the region extending across the entire length in the magnetic flux direction. As a result, the ratio w/l of the treatment width w of the region irradiated with the laser to the entire length l of the heat-treated compact in the circumferential direction about the axis in the magnetic flux direction was 7%. The heat-treated compacts on which the coil would not be disposed may also be irradiated with a laser. The heat-treated compacts irradiated with the laser constitute compacts and the compacts are referred to as Sample 1-1.

<Laser Irradiation Conditions>
Type: fiber laser
Wavelength: 1064 nm
Irradiation interval/beam diameter ratio: 0.15
Pulse width: 200 ns
Scan interval/beam diameter ratio: 0.08
Number of times of overlap: 10
Energy density U: 61.1 W/mm$^2$

[Sample 1-2]

The order of steps for preparing compacts of Sample 1-2 is different from that for Sample 1-1. The order of steps is step a→step b→step d→step c. The region irradiated with the laser in step d was the same as in Sample 1-1.

[Sample 1-3]

Compacts of Sample 1-3 are different from those of Sample 1-1 in that the surfaces of the compacts are not irradiated with a laser. In other words, the compacts of Sample 1-3 are prepared through step a→step b→step c in that order.

[Evaluation 1]

The compacts of Samples 1-1 to 1-3 were respectively combined into ring-shaped structures to prepare magnetic cores for testing. A coil constituted of a wire was disposed on each of the cores for testing to prepare measurement members for measuring magnetic properties. The following magnetic properties were evaluated.

[Magnetic Property Test]

For each measurement member, the hysteresis loss Wh (W) and the eddy current loss We (W) of samples at an excited magnetic flux density Bm: 1 kG (=0.1 T) and a measurement frequency: 5 kHz were determined by using an AC-BH curve tracer, and the loss W (W) of the entire samples was calculated.

The characteristic values observed in the test are described in Table 1.

TABLE 1

| Sample No. | Eddy current loss We (W) | Hysteresis loss Wh (W) | Loss W (W) |
|---|---|---|---|
| 1-1 | 1.9 | 17.5 | 19.4 |
| 1-2 | 2.2 | 17.3 | 19.5 |
| 1-3 | 17.5 | 17.4 | 34.9 |

<<Results>>

The eddy current loss was significantly decreased in Sample 1-1, that is, a sample in which part of the surface of the heat-treated compact was irradiated with a laser after the heat-treatment, compared to Sample 1-3 for which no laser irradiation was conducted. The eddy current loss was also decreased in Sample 1-2 in which the heat-treatment was performed after the laser irradiation.

The test results described above show that it is effective for decreasing the eddy current loss and the loss to perform laser irradiation on a part of a surface of a heat-treated compact, in particular, a part of a surface that would be parallel to the direction of a magnetic flux that occurs when excitation is conducted on the reactor core.

Samples not subjected to heat-treatment before or after the laser irradiation were prepared and the same test was performed on these samples. The eddy current loss was effectively decreased as with Samples 1-1 and 1-2 above subjected to heat treatment either before or after the laser irradiation.

Test Example 2

In Test Example 2, Samples 2-1 and 2-2 were prepared by the same orders of the steps as with Samples 1-1 and 1-2 in Test Example 1 but under different laser irradiation conditions in step d. The magnetic properties of these samples were evaluated as in Evaluation 1 above. The laser irradiation conditions are described below and the observed characteristic values are shown in Table 2. In the table, the results of Sample 1-3 prepared in Test Example 1 are also shown.

<Laser irradiation conditions>
Type: fiber laser
Wavelength: 1064 nm
Irradiation interval/beam diameter ratio: 0.07
Pulse width: 120 ns
Scan interval/beam diameter ratio: 0.05
Number of times of overlap: 40
Energy density U: 123.6 W/mm$^2$

TABLE 2

| Sample No. | Eddy current loss We (W) | Hysteresis loss Wh (W) | Loss W (W) |
|---|---|---|---|
| 2-1 | 1.1 | 16.5 | 17.6 |
| 2-2 | 1.4 | 16.6 | 18.0 |
| 1-3 | 17.5 | 17.4 | 34.9 |

<<Results>>

As in Test Example 1, Samples 2-1 and 2-2 having surfaces partly irradiated with a laser showed lower eddy current losses compared to Sample 1-3 not irradiated with a laser.

Test Example 3

Figure 5:
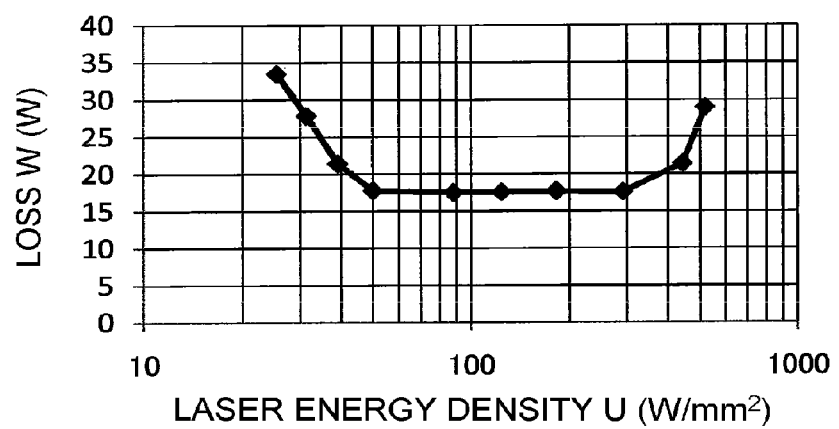
FIG. 5 is a graph showing the relationship between the energy density of the laser and the loss of the compact in samples in Test Example 3.

In Test Example 3, Samples 3-1 to 3-10 were prepared under the same conditions as with Sample 2-1 prepared in Test Example 2 except that the energy density U among the laser irradiation conditions in step d was changed. The magnetic properties of the samples were evaluated as in Evaluation 1 above. The energy density U applied to each sample and the observed characteristic values are shown in Table 3 and FIG. 5.

TABLE 3

| Sample No. | Energy density U (W/mm$^2$) | Eddy current loss We (W) | Hysteresis loss Wh (W) | Loss W (W) |
|---|---|---|---|---|
| 3-1 | 25.4 | 15.4 | 18.1 | 33.5 |
| 3-2 | 31.3 | 10.3 | 17.6 | 27.9 |
| 3-3 | 39.1 | 4.7 | 16.8 | 21.5 |
| 3-4 | 50.1 | 2.0 | 16.8 | 18.8 |
| 3-5 | 88.1 | 1.0 | 16.5 | 17.5 |
| 3-6 | 123.6 | 1.0 | 16.6 | 17.6 |

TABLE 3-continued

| Sample No. | Energy density U (W/mm²) | Eddy current loss We (W) | Hysteresis loss Wh (W) | Loss W (W) |
|---|---|---|---|---|
| 3-7 | 182.6 | 1.0 | 16.7 | 17.7 |
| 3-8 | 290.8 | 1.3 | 16.3 | 17.6 |
| 3-9 | 442.7 | 4.6 | 16.9 | 21.5 |
| 3-10 | 518.9 | 11.3 | 17.6 | 28.9 |

<<Results>>

Compared to Sample 1-3 (Test Example 1), all of Samples 3-1 to 3-10 exhibited a lower eddy current loss. The eddy current loss was lower in Samples 3-3 to 3-9 than in Samples 3-1, 3-2, and 3-10. In particular, Samples 3-4 to 3-8 exhibited particularly low eddy current losses.

These tests results show that it is more effective for reducing the eddy current loss to adjust the energy density U of the laser applied to 37.0 W/mm² or more and 450.0 W/mm² or less.

Test Example 4

In Test Example 4, Samples 4-1 to 4-10 were prepared under the same conditions as with Sample 2-1 prepared in Test Example 2 except that the irradiation interval/beam diameter ratio among the laser irradiation conditions in step d was changed. The magnetic properties of the samples were evaluated as in Evaluation 1. The irradiation interval/beam diameter ratio of the laser applied to each sample and the observed characteristic values are shown in Table 4.

TABLE 4

| Sample No. | Irradiation interval/beam diameter ratio | Eddy current loss We (W) | Hysteresis loss Wh (W) | Loss W (W) |
|---|---|---|---|---|
| 4-1 | 0.07 | 1.2 | 17.1 | 18.3 |
| 4-2 | 0.14 | 1.1 | 17.2 | 18.3 |
| 4-3 | 0.21 | 1.3 | 17.1 | 18.4 |
| 4-4 | 0.28 | 1.2 | 17.2 | 18.4 |
| 4-5 | 0.29 | 1.6 | 17.2 | 18.8 |
| 4-6 | 0.31 | 1.9 | 17.2 | 19.1 |
| 4-7 | 0.33 | 4.3 | 16.7 | 21.0 |
| 4-8 | 0.38 | 5.2 | 16.7 | 21.9 |
| 4-9 | 0.40 | 5.6 | 16.8 | 22.4 |
| 4-10 | 0.42 | 6.0 | 16.9 | 22.9 |

<<Results>>

The eddy current loss was reduced in all of Samples 4-1 to 4-10 compared to Sample 1-3 (Test Example 1). The eddy current loss was lower in Samples 4-1 to 4-7 than in Samples 4-8 to 4-10. The eddy current loss was particularly low in Samples 4-1 to 4-6.

The results show that decreasing the irradiation interval/laser beam diameter ratio results in a decrease in eddy current loss and that it is more effective for decreasing the eddy current loss to adjust the ratio to 0.35 or less and more particularly 0.30 or less.

Test Example 5

In Test Example 5, Samples 5-1 to 5-9 were prepared under the same conditions as with Sample 2-1 prepared in Test Example 2 except that, among the laser irradiation conditions in step d, the number of times of overlap was changed. The magnetic properties of the samples were evaluated as in Evaluation 1. The number of times of overlap of the laser applied to the samples and the observed characteristic values are shown in Table 5.

TABLE 5

| Sample No. | Number of times of overlap | Eddy current loss We (W) | Hysteresis loss Wh (W) | Loss W (W) |
|---|---|---|---|---|
| 5-1 | 40 | 1.1 | 17.2 | 18.3 |
| 5-2 | 30 | 1.1 | 17.2 | 18.3 |
| 5-3 | 20 | 1.1 | 17.3 | 18.4 |
| 5-4 | 15 | 1.2 | 17.4 | 18.6 |
| 5-5 | 10 | 1.2 | 17.4 | 18.6 |
| 5-6 | 5 | 3.1 | 16.4 | 19.5 |
| 5-7 | 2 | 12.7 | 18.2 | 30.9 |
| 5-8 | 1 | 14.9 | 18.5 | 33.4 |
| 5-9 | 0 | 17.5 | 19.0 | 36.5 |

<<Results>>

The eddy current loss was reduced in Samples 5-1 to 5-8 compared to Sample 5-9. The eddy current loss was lower in Samples 5-1 to 5-6 than in Samples 5-7 and 5-8. In particular, the eddy current loss was particularly low in Samples 5-1 to 5-5.

The results show that the eddy current loss can be reduced by increasing the number of times of laser overlap and that it is more effective for reducing the eddy current loss to adjust the number of times of overlap to 5 or more and particularly 10 or more.

Test Example 6

Figure 6:
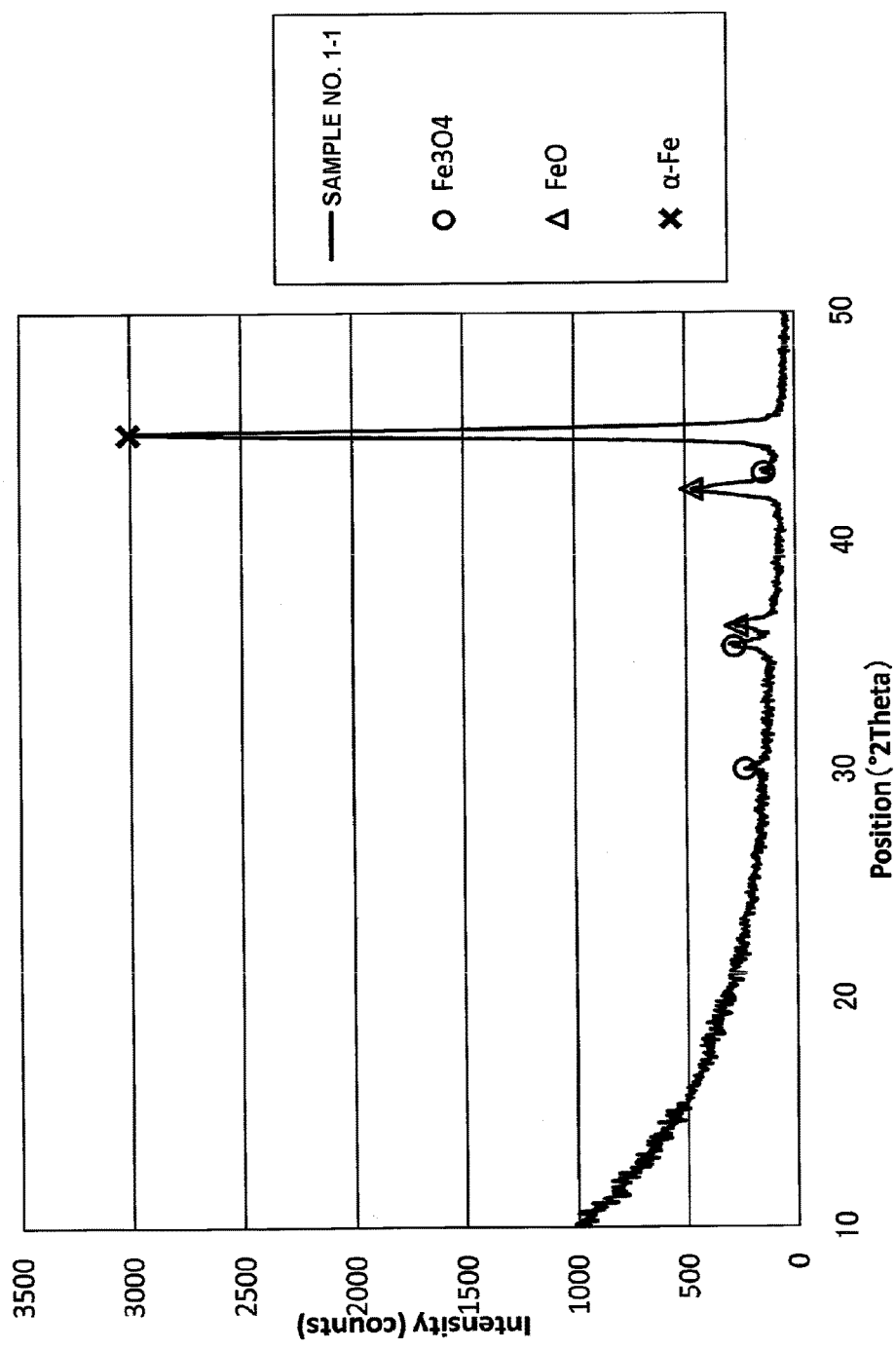
FIG. 6 is a graph showing the results of X-ray diffraction on Sample No.
Figure 7:
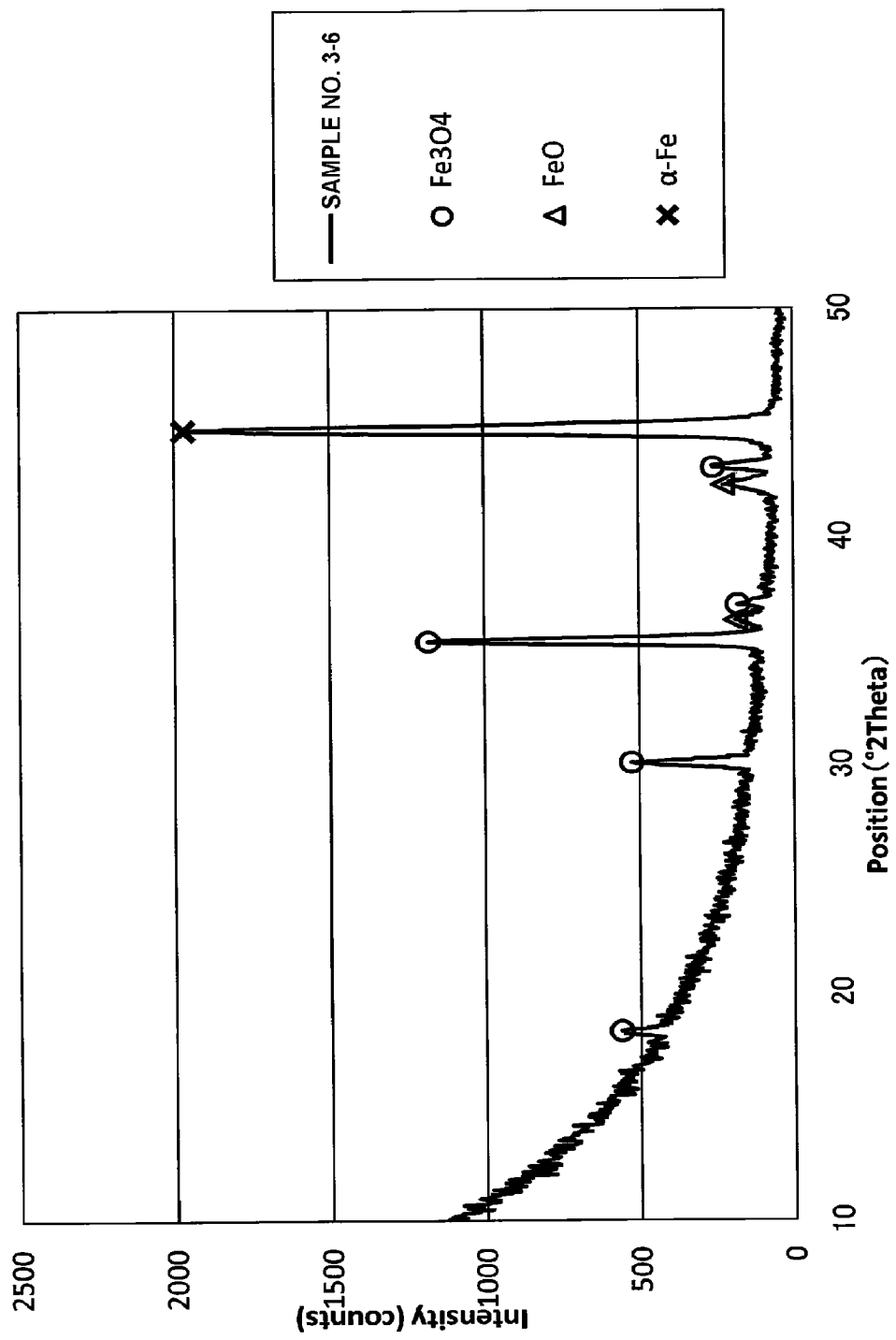
FIG. 7 is a graph showing the results of X-ray diffraction on Sample No. 3-6.
Figure 8:
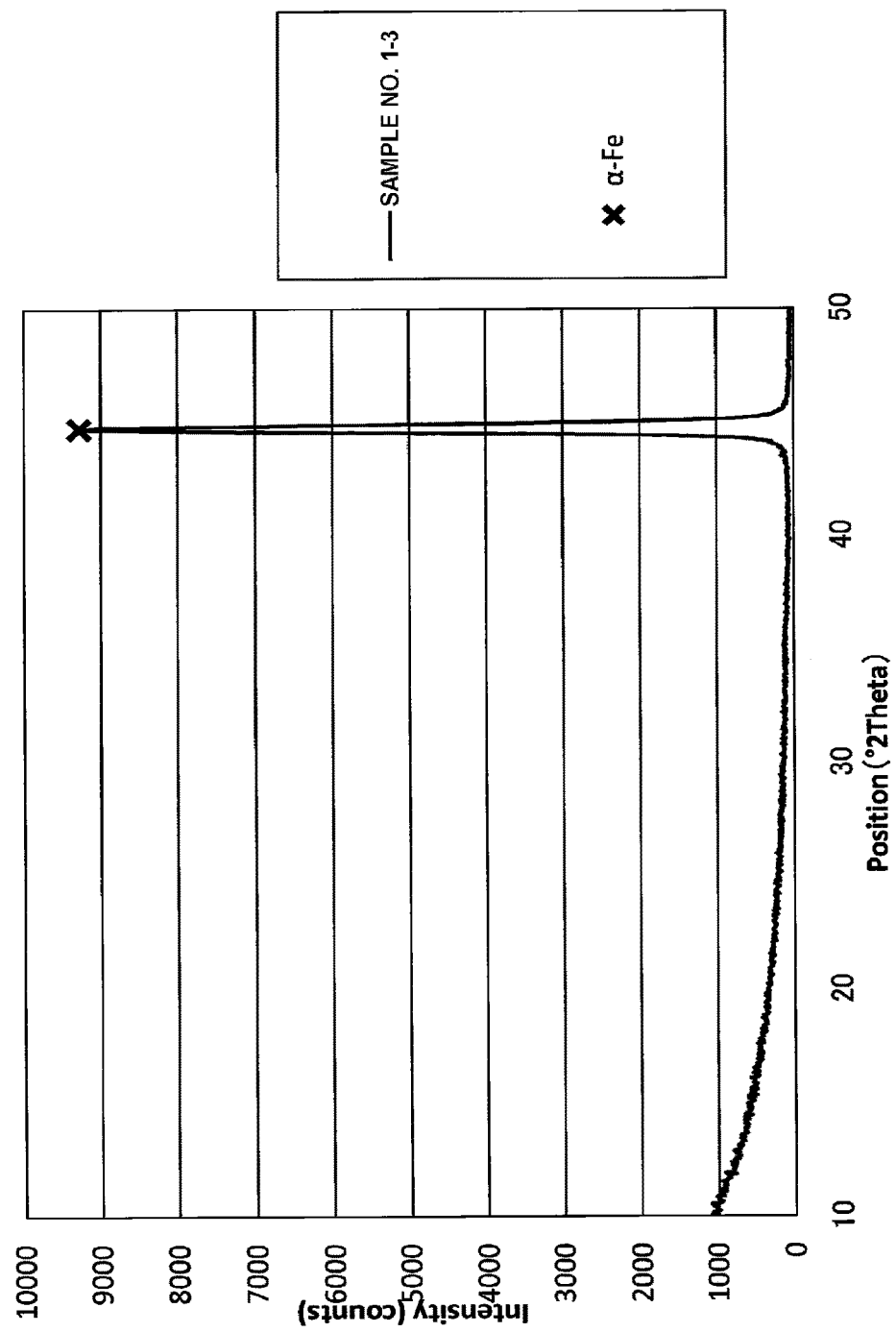
FIG. 8 is a graph showing the results of X-ray diffraction on Sample No. 1-3.
Figure 9:
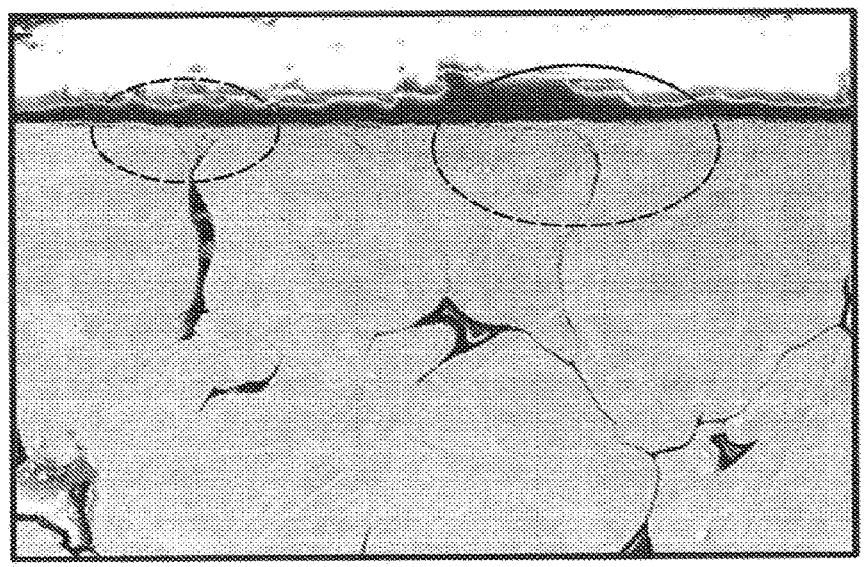
FIG. 9 includes SEM images showing the surface state of a sample before the laser irradiation in the process of producing the compact of Sample No. 1-1, in which (A) shows a cross-section near the surface and (B) shows the surface.
Figure 9:
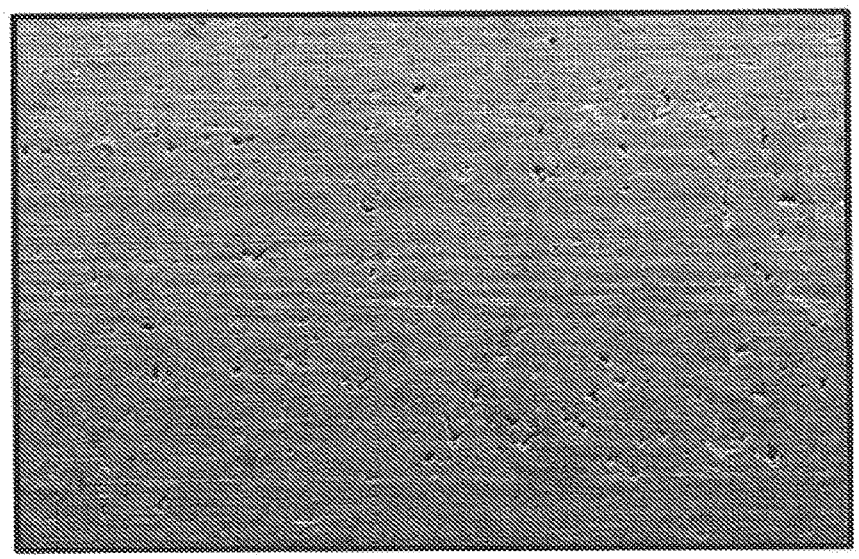
Figure 10:
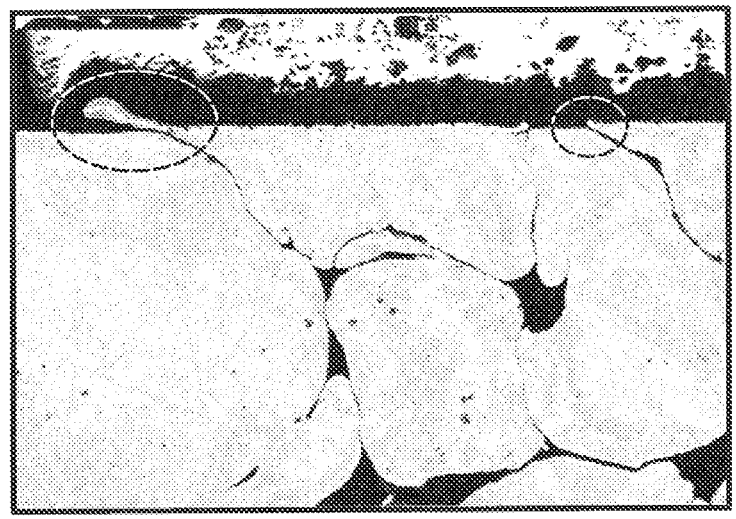
FIG. 10 includes SEM images showing the surface state of a sample after the laser irradiation in the process of producing the compact of Sample No. 1-1, in which (A) shows a cross-section near the surface and (B) shows the surface.
Figure 10:
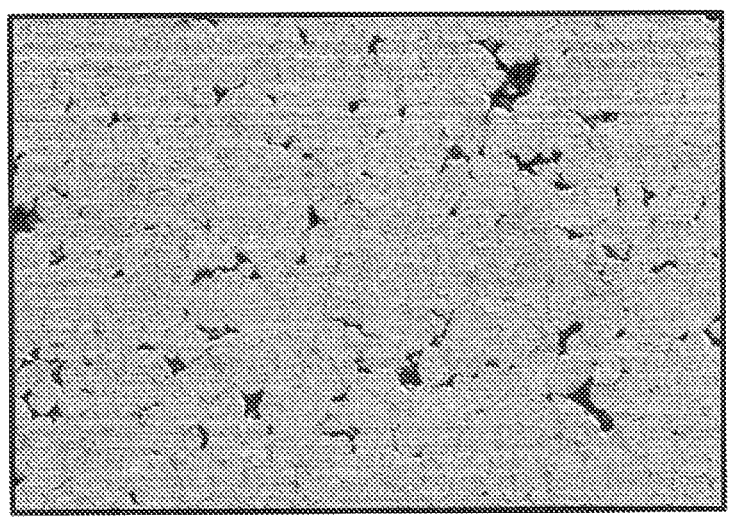
Figure 11:
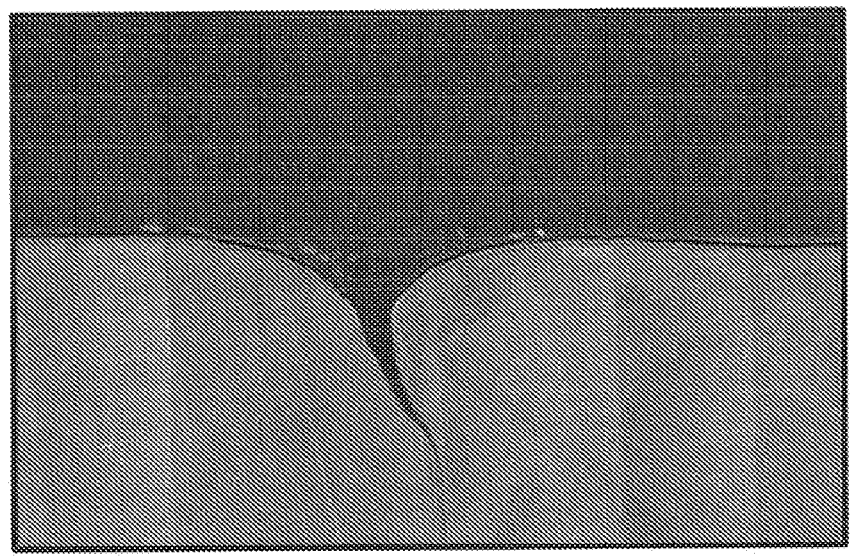
FIG. 11 includes SEM images showing the surface state of a sample after the laser irradiation in the process of producing the compact of Sample No. 3-5, in which (A) shows a cross-section near the surface and (B) shows the surface.
Figure 11:
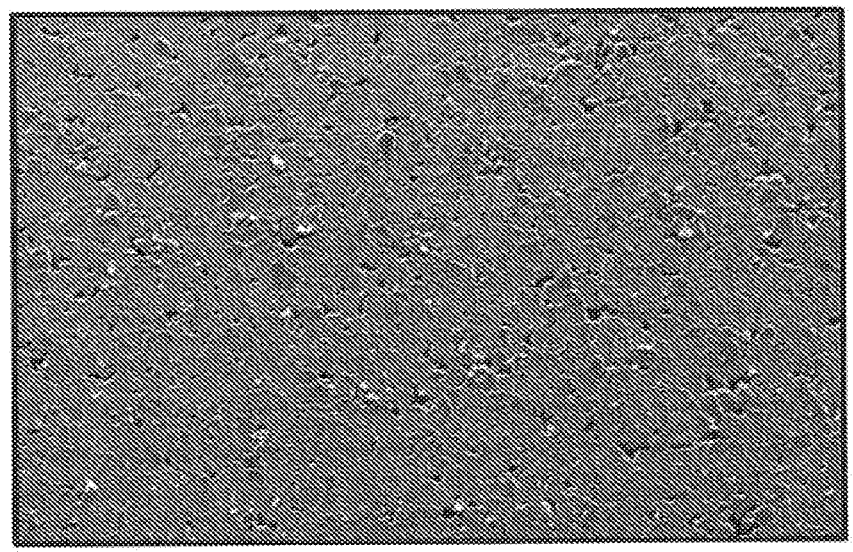
Figure 12:
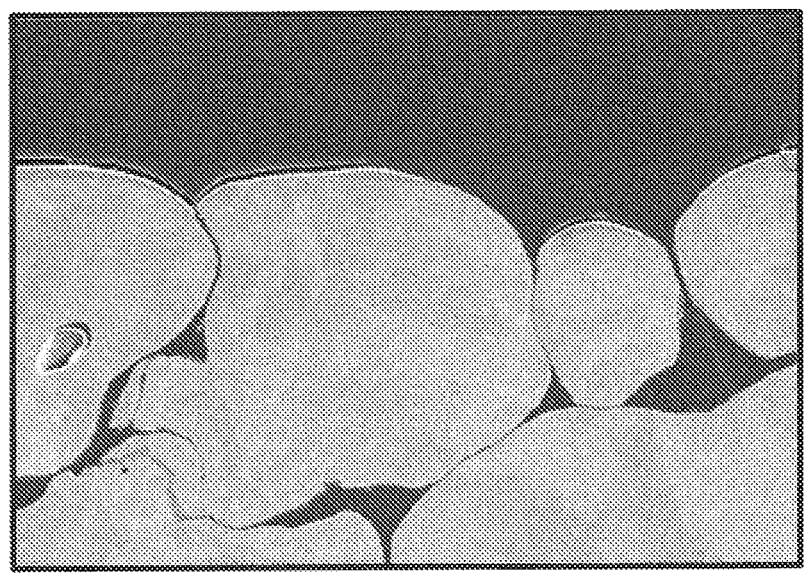
FIG. 12 includes SEM images showing the surface state of a sample after the laser irradiation in the process of producing the compact of Sample No. 3-6, in which (A) shows a cross-section near the surface and (B) shows the surface.
Figure 12:
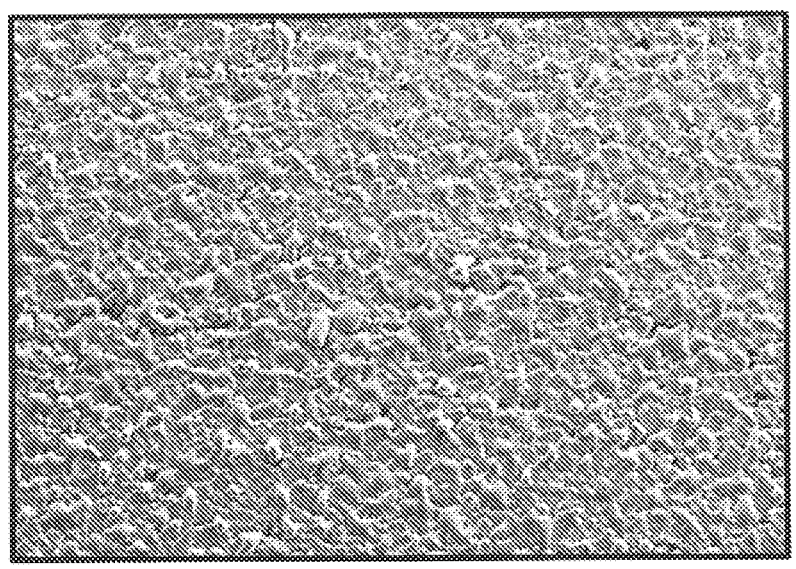
Figure 13:
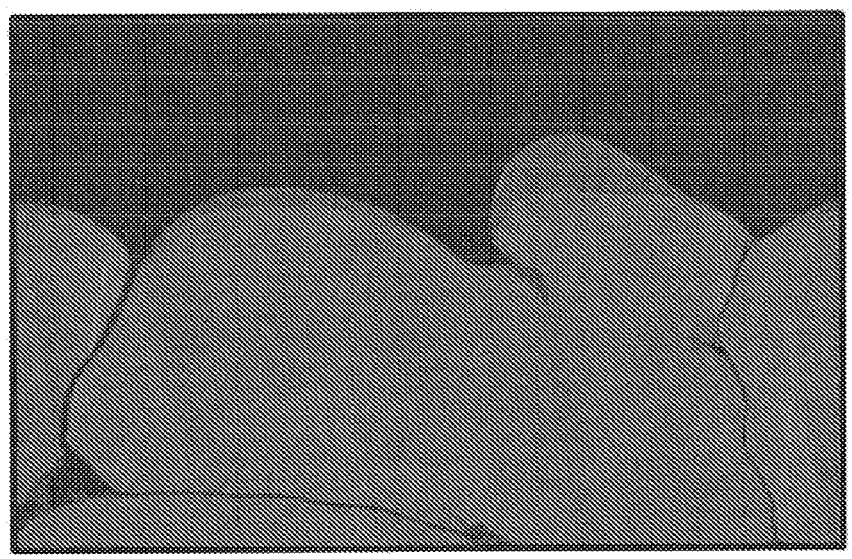
FIG. 13 includes SEM images showing the surface state of a sample after the laser irradiation in the process of producing the compact of Sample No. 3-8, in which (A) shows a cross-section near the surface and (B) shows the surface.
Figure 13:
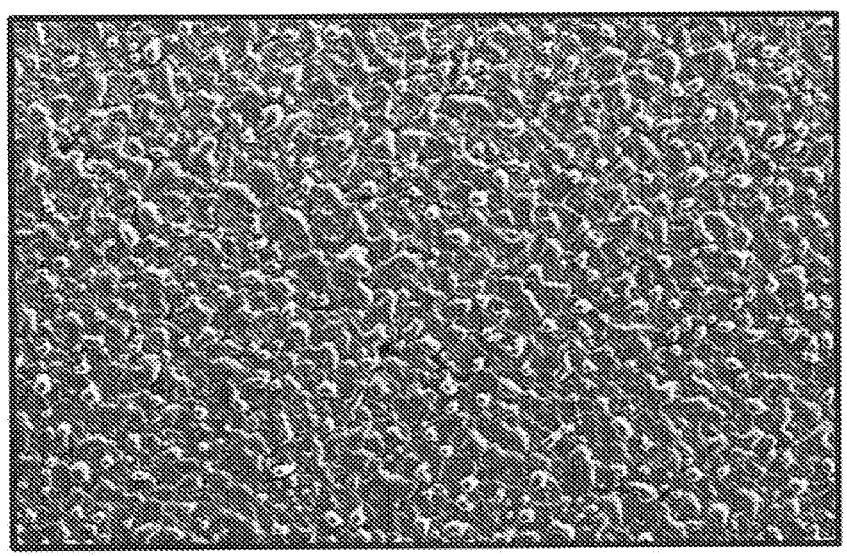

In Test Example 6, the components of the surfaces of Samples 1-1 and 3-6 were measured with an X-ray diffractometer of a parallel optical system using a multilayer mirror. The components of Sample 1-1 and 3-6 in the regions irradiated with the laser were measured. The components of a slide-contact surface of Sample 1-3 were also measured. The measurement conditions are shown below. The results from Samples 1-1, 3-6, and 1-3 are shown in FIGS. 6 to 8. In the graphs, circles indicate $Fe_3O_4$, triangles indicate FeO, and crosses indicate α-Fe.

<Measurement Conditions>

Instrument used: X-ray diffractometer (X'pert produced by PANalytical)
X-ray used: Cu-Kα
Excitation conditions: 45 kV, 40 mA
Measurement method: θ-2θ measurement <<Results>>

Compared to Sample 1-3 (FIG. 8), Sample 1-1 (FIG. 6) and Sample 3-6 (FIG. 7) contain less a-Fe and more FeO and $Fe_3O_4$. Comparing Sample 1-1 with Sample 3-6, the amount of a-Fe is lower in Sample 3-6 in which the energy density U of the laser is high than in Sample 1-1. Whereas a larger amount of FeO than $Fe_3O_4$ was detected in Sample 1-1, a larger amount of $Fe_3O_4$ than FeO was detected in Sample 3-6.

According to these results, laser irradiation decreases the amount of a-Fe and increases the amounts of FeO and $Fe_3O_4$. It was found that increasing the laser energy density U increases the amount of $Fe_3O_4$ more than FeO. In addition, as shown in Test Examples 1 and 3, the loss is lower in Samples 1-1 and 3-6 than in Sample 1-3. Thus, it was found that having oxide films containing at least one of FeO and $Fe_3O_4$ on a surface of a compact decreases the loss and incorporation of more $Fe_3O_4$ than FeO further decreases the loss.

Test Example 7

In Test Example 7, Samples 7-1 to 7-4 were prepared under the same conditions as with Sample 2-1 prepared in Test Example 2 except that the energy density U was changed among the laser irradiation conditions in step d. In addition, Sample 7-5 was prepared as with Sample 1-3 prepared in Test Example 1. The oxygen content on the surface of each sample was measured with the instrument described below by energy dispersive X-ray spectroscopy (EDX). In particular, the region irradiated with a laser was measured in Samples 7-1 to 7-4 and a part of a slide-contact surface that comes into sliding contact with a die and a part of a pressure-contact surface that comes into contact with a punch were measured in Sample 7-5. The oxygen content is the ratio determined by assuming that the total content of iron and oxygen in a region extending from a surface of each sample to a depth of about 1 μm toward the inner side of the sample is 100 mass %. The surface treatment performed, the portions that were measured, and the results are shown in Table 6.

<Measurement Conditions>

Instrument used: Scanning electron microscope (SEM) (SUPRA35VP produced by ZEISS)

Energy dispersive X-ray analyzer (EDX analyzer) (GENESIS4000 produced by EDAX)

Acceleration voltage: 15 kV

Measurement region: 1.80×0.835 mm$^2$

TABLE 6

| Sample No. | Surface treatment | Portions measured | Energy density U (W/mm$^2$) | Oxygen content (mass %) | Loss W (W) |
|---|---|---|---|---|---|
| 7-1 | Laser | Treated portion | 85.4 | 18.6 | 18.4 |
| 7-2 | Laser | Treated portion | 62.7 | 17.3 | 18.6 |
| 7-3 | Laser | Treated portion | 43.3 | 9.4 | 19.5 |
| 7-4 | Laser | Treated portion | 27.8 | 6.1 | 31 |
| 7-5 | Not treated | Slide-contact surface | — | 4.6 | 36.5 |
|  | Not treated | Press-contact surface | — | 5.1 |  |

<<Results>>

Compared to Sample 7-5, Samples 7-1 to 7-4 had small losses. In particular, the losses of Samples 7-1 to 7-3 having an oxygen content of 9 mass % or more were particularly small. The oxygen content of Sample 7-4 and the oxygen contents of the slide-contact surface and the press-contact surface of Sample 7-5 were each about 6 mass %.

The oxygen contents in Samples 7-1 to 7-4 were larger than in Sample 7-5 since surfaces of the compacts were oxidized by laser irradiation and oxide films were formed. In particular, it is believed that the oxygen contents of Samples 7-1 to 7-3 were high because oxidation occurred more extensively at a high laser energy density U. It is also believed that because not only the conductive portions were disrupted but also oxide films were formed, the eddy current could be sufficiently blocked and the loss was reduced. Therefore, it was found that the loss can be further reduced by adjusting the oxygen content of the surface to 9 mass % or more.

Provided below are reference examples in which compacts of Samples 7-11 to 7-13 below were prepared and the oxygen contents of the surfaces of the samples were measured as in Test Example 7.

[Sample 7-11]

A compact of Sample 7-11 was prepared by performing step a→step b→step c in that order, and performing step d in which an electrolysis described below was performed on a surface of a heat-treated compact instead of irradiating the compact with a laser.

(Electrolysis)

Electrolysis involves immersing the heat-treated compact in a vessel containing sodium nitrate having a concentration of 20 mass %, causing a Pt electrode serving as anode to contact with a portion to be electrolyzed, immersing another Pt electrode serving as a cathode in the electrolyte, and causing the cathode Pt electrode to contact other portions of the heat-treated compact. While maintaining this state, a voltage of 65 V was applied and a 40 A current was allowed to flow for 35 seconds. The w/l ratio in the electrolysis was 7%. The compact after the electrolysis was washed with water.

[Sample 7-12]

A compact of Sample 7-12 was prepared by performing step a→step b→step c in that order as with Sample 7-11, and performing step d in which an acid treatment described below was performed on a surface of a heat-treated compact instead of irradiating the compact with a laser.

(Acid Treatment)

An acid treatment involved immersing a part of a surface of the heat-treated compact for 20 minutes in a 26° C. concentrated hydrochloric acid having pH of 1 in a vessel while stirring the concentrated hydrochloric acid. The w/l ratio in the acid treatment was 7%. The compact after the acid treatment was washed with water.

[Sample 7-13]

A compact of Sample 7-13 was prepared by performing step a→step b→step c in that order. Here, the type of the coated soft magnetic powder prepared is different from that used in step a of Test Example 1 and step b differs from step b in Test Example 1 in that an outer lubrication forming method in which a lubricant is applied to a die is employed. In other words, the outer lubrication forming method was employed so that a sufficient lubricating effect is achieved and conduction portions are not easily formed in the slide-contact surface that comes into sliding contact with the die.

To be more specific, the insulating coatings that coated the surfaces of the soft magnetic particles in step a were changed to multilayered insulating coatings. First, soft magnetic particles were subjected to chemical conversion to form an inner film (thickness: about 20 nm or less) composed of a metal phosphate compound containing hydration water and then particles having the inner films were mixed with a commercially available resin material (silicone XC96-B0446 produced by Momentive (material that forms a silicone resin by hydrolysis and condensation polymerization)) in a heated atmosphere (80° C. to 150° C.) to form insulating layers (total average thickness: 500 nm) having a multilayer structure constituted by an inner film composed of a metal phosphate compound and an outer layer composed of a silicone resin. In injecting the coated soft magnetic powder into a die, a lubricant composed of ethylenebis (stearic acid amide) was applied to an inner wall of a die that would come into contact with the coated soft magnetic powder. Then a pressure of 950 MPa was applied to form a compact by pressure forming. The slide-contact surface of the compact that made a slide contact with the die was observed but no conductive portions were found.

The oxygen content was measured as described above at a treated portion in Samples 7-11 and 7-12 and at a press-contact surface in Sample 7-13. The surface treatment performed, the portions measured, and the oxygen contents are shown in Table 7.

TABLE 7

| Sample No. | Surface treatment | Portion measured | Oxygen content (mass %) |
|---|---|---|---|
| 7-11 | Electrolysis | Treated portion | 4.3 |
| 7-12 | Acid | Treated portion | 4.1 |
| 7-13 | Not treated | Pressurized surface | 8.1 |

<<Results>>

The oxygen content of the surface was about 4 mass % in Samples 7-11 and 7-12 in which the electrolysis and acid treatment were performed instead of laser irradiation. In other words, it was found that a surface portion that has a particular oxygen content is not formed on the surface of the compact even when electrolysis and an acid treatment are performed. In contrast, the oxygen content of the surface of Sample 7-13, in which the insulating coatings coating the soft magnetic particles, i.e., the ingredient of the compact, are thick and the oxygen content as the ingredient is high compared to Samples 7-1 to 7-3, was about 8 mass %, failing to achieve 9 mass % or more. In other words, it was found that even when a compact is prepared by using coated soft magnetic powder having a high oxygen content as the ingredient, the oxygen content of the surface does not become 9 mass % or more.

Test Example 8

Figure 14:
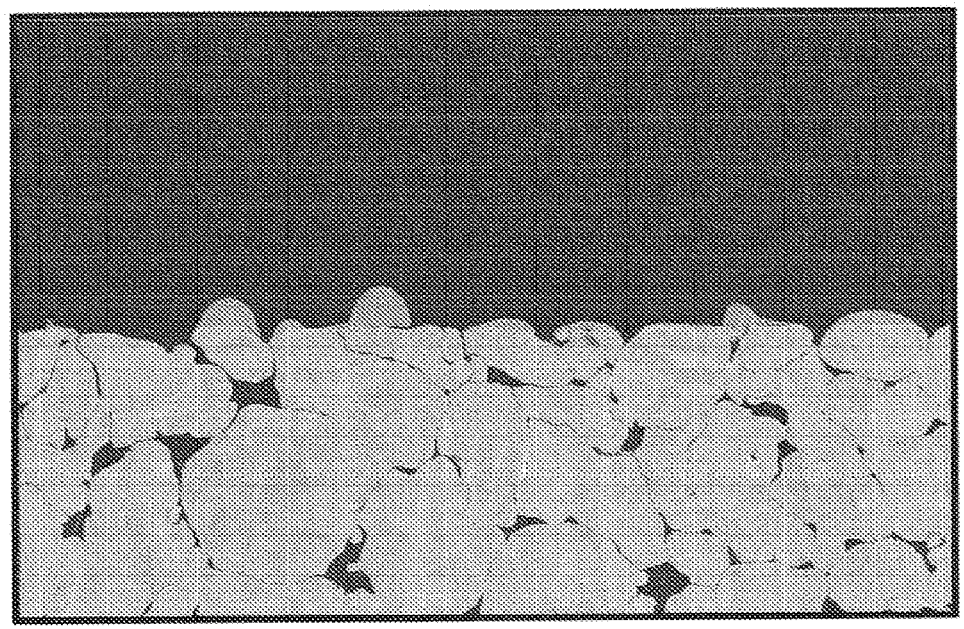
FIG. 14 is a SEM image showing the surface state of a sample after the laser irradiation in the process of producing the compact of Sample No. 3-9, the image showing a cross-section near the surface.

In Test Example 8, a surface of Sample 1-1 before and after the laser irradiation and surfaces of Samples 3-5, 3-6, 3-8, and 3-9 were observed with a microscope. The surface observation was carried out by taking an enlarged photograph of a surface of each sample with SEM. The enlarged images are shown in FIGS. 9 to 14. FIGS. 9(A), 10(A), 11(A), 12(A), and 13(A) respectively show cross-sections of Sample 1-1 before and after the laser irradiation and Samples 3-5, 3-6, and 3-8. The surface of the same sample is shown in (B). FIG. 14 shows a cross-section of Sample 3-9.

<<Results>>

[Sample No. 1-1]

In Sample 1-1 shown in FIG. 9(A), the compact was pulled out toward the right-hand side of the drawing, the particle on the right-hand side of each broken-line circle is referred to as a soft magnetic particle α, and the particle on the left-hand side is referred to as a soft magnetic particle β. The same applies for FIG. 10(A). On the surface before the laser irradiation, as indicated by the broken-line circles, a thin-film part formed on each particle α reaches the adjacent particle β on the left-hand side, thereby establishing a conductive state. In particular, the portion marked by the broken-line circle on the right clearly shows that the particle α on the right is stretched into a thin-film, thereby forming a thin-film part (conductive portion) that overlaps the surface of the particle β on the left. Due to overlap of the adjacent particles, substantially no disrupted portions are found in the thin-film part (refer to (B) of the same figure). In the surface after the laser irradiation shown in FIG. 10(A), as highlighted by the broken-line circles, the thin-film parts formed in the particles melted and flowed, thereby creating disrupted regions. For example, the surface of the particle β on the left-hand side in the broken-line circle on the right-hand side constitutes a disrupted region. While the disrupted region is formed, a lump (aggregated portion) that protrudes from the particle α so as to partly hang over the surface of the adjacent particle β is formed. A thick oxide film (dark gray portion) is formed in this aggregated portion and an oxide film thinner than that in the aggregated portion is formed on the surface of the particle α in portions other than where the aggregated portion is formed. The core of the aggregated portion indicated by the broken-line circle on the left-hand side remains unoxidized and in a state of metal that constitutes the soft magnetic particles. As shown in FIG. 10(B), the area of the thin-film part is small compared to before the laser irradiation (FIG. 9(B)), the number of disrupted regions is increased, and the gaps between particles are identifiable.

[Sample No. 3-5]

As shown in FIG. 11(A), a thin-film part (for example, the parts marked by broken-line circles in FIG. 9(A)) which had been formed across the adjacent particles on the surface of Sample 3-5 melted and flowed due to laser irradiation and formed an oxide film that covers the surface of each particle. Moreover, the surface-side-parts of the adjacent particles are not in contact with each other and a crevasse-shaped disrupted region is formed between the surface-side-parts of the adjacent particles. Moreover, as shown in FIG. 11(B), the area of the thin-film part is smaller than in Sample 1-1, the number of disrupted portions is increased, and the gaps between particles are identifiable.

[Sample No. 3-6]

As shown in FIG. 12(A), crevasse-shaped disrupted regions are formed between surface-side-portions of adjacent particles on the surface of Sample 3-6 and an oxide film that covers the surface of each particle is formed. In FIG. 12(A), dark gray parts at surfaces of the particles are the oxide films. The same applies for FIGS. 13 and 14. As shown by the particle at the center of the drawing, a thin-film part (for example, the parts marked by broken-line circles in FIG. 9(A)) which had been formed across the adjacent particles melted and flowed due to laser irradiation and formed a gathered portion constituted by an oxide film thicker at the center than in the side portions. In particular, the thickness of the oxide film formed at the surface of the particle on the left-hand side of the drawing is as thick as about 0.75 μm. As shown in FIG. 12(B), the area of the thin-film part is smaller than in Sample 3-5 and the number of the disrupted portions is larger.

[Sample No. 3-8]

In Sample 3-8, a thin-film part (for example, the parts marked by broken-line circles in FIG. 9(A)) which had been formed across the adjacent particles melted and flowed due to laser irradiation and crevasse-shaped disrupted portions are formed between the surface-side-parts of the adjacent particles on the sample surface as shown in FIG. 13(A). Moreover, a gathered portion constituted by an oxide film thicker at the center than in the two sides is formed at the center of the particle. In particular, the thickness of the oxide film formed at the surface of the particle on the right-hand side of the drawing is as thick as about 3.0 μm. As shown in FIG. 13(B), the area of the thin-film part is smaller than in Sample 3-6 and the number of the disrupted portions is larger.

[Sample No. 3-9]

In Sample 3-9 shown in FIG. 14, an inverted U-letter-shaped oxide film (gathered portion) is formed at the center of the drawing and the thickness thereof is about 10 μm.

Presumably, in Sample 1-1 before laser irradiation, insulating coatings at the surface of the compact are damaged and the soft magnetic particles are stretched as a result of sliding contact with the die in the forming step and thus conductive portions through which soft magnetic particles become conductive to each other are formed at the surface; hence, heat generated by laser irradiation does not easily disperse in the conductive portions and a high-temperature state is easily maintained in the conductive portions. Presumably, the conductive portions were melted and disrupted as a result. It is believed that since the energy density U of the laser applied to Sample 1-1 was smaller than that applied to other samples, thin-film parts remained between the lumps and oxide films covering the outer peripheries of the lumps were formed. In contrast, the lumps formed in Sample 1-1 and the thin-film parts remaining between the lumps in Sample 1-1 were oxidized in Sample 3-5 because the energy density U of the laser applied was 88.1 W/mm$^2$, which is higher than that applied to Sample 1-1. The same applies to Sample 3-6 because the energy density U of the laser applied was 123.6 W/mm$^2$, which is higher than that applied to Sample 3-5 and to Sample 3-8 because the energy density U of the laser applied was 290.8 W/mm$^2$, which is higher than that applied to Sample 3-6. It is believed that the oxide films covering the surfaces were formed as a result. The higher the energy density applied, the easier it is to maintain a high-temperature state in thin-film parts, further promoting melting of the thin-film parts. The constituent material of the melted thin-film parts aggregates due to the surface tension so as to minimize the surface area. It is believed that the central portion of the oxide film became thick as a result of this.

[Summary]

The higher the laser energy density U, the easier it is to disrupt the conductive portions. Moreover, it was found that the area of the oxide film covering the surface of each particle is increased and the oxide film can have a thick portion.

The present invention is not limited to the above-described embodiments and is subject to alternations and modifications without departing from the scope of the present invention.

INDUSTRIAL APPLICABILITY

A method for producing a compact according to the present invention is suitable for use in fabricating various types of magnetic cores. A compact according to the present invention is suitable for use in reactors used in boosting circuits of hybrid cars and in power generating stations and substations and as a material for cores of transformers and choke coils. A reactor according to the present invention can be used in a constitutional member of power conversion devices such as DC-DC converters mounted in vehicles such as hybrid cars, plug-in hybrid cars, electric cars, and fuel cell cars, and converters for air conditioners.

The invention claimed is:

1. A method for producing a compact by using coated soft magnetic powder that includes a plurality of coated soft magnetic particles constituted by soft magnetic particles and insulating coatings coating outer peripheries of the soft magnetic particles, the method comprising:
    a raw material preparation step of preparing a raw compact by press-forming the coated soft magnetic powder in a die;
    a raw compact withdrawal step of withdrawing the raw compact from the die after it that has been press-formed; and
    an irradiation step of irradiating at least part of a surface of the raw compact with a laser,
    wherein the laser is one type of laser selected from a YAG laser, a YVO$_4$ laser, and a fiber laser,
    wherein the raw compact withdrawal step causes a surface of the raw compact to come into sliding contact with the die during withdrawal of the raw compact from the die forming a conductive portion,
    wherein the irradiation step is performed on at least part of a surface of the raw compact to remove at least part of the conductive portion, the surface being a surface that has come into sliding contact with the die, and
    wherein the irradiation step is performed on a surface of the raw compact, the surface being a surface that serves as at least part of a parallel surface parallel to a direction of a magnetic flux generated by excitation using the compact as a magnetic core.

2. The method for producing a compact according to claim 1, wherein the irradiation step is performed on a surface of the raw compact, the surface being the parallel surface, and in a region that extends across the entire length of the compact in the direction of the magnetic flux.

3. A method for producing a compact by using coated soft magnetic powder that includes a plurality of coated soft magnetic particles constituted by soft magnetic particles and insulating coatings coating outer peripheries of the soft magnetic particles, the method comprising:
    a raw material preparation step of preparing a raw compact by press-forming the coated soft magnetic powder in a die;
    a raw compact withdrawal step of withdrawing the raw compact from the die after it that has been press-formed; and
    an irradiation step of irradiating at least part of a surface of the raw compact with a laser,

---

Reference Signs List 100 reactor
1 compact   10 raw compact
2 coil   2a, 2b coil element   2r connecting part
3 magnetic core (reactor core)
31 inner core unit   31m core pieces   31g gap members   32 exposed core unit
31p pressed surface   31s, 31so, 31sp slide-contact surface
1100 power conversion device
1110 converter   1111 switching element
1112 drive circuit   L reactor   1120 inverter
1150 converter for a power supply device   1160 converter for supplying power to auxiliaries
1200 vehicle
1210 main battery   1220 motor   1230 sub battery
1240 auxiliaries   1250 wheels wherein the laser is one type of laser selected from a YAG laser, a $YVO_4$ laser, and a fiber laser, wherein the raw compact withdrawal step causes a surface of the raw compact to come into sliding contact with the die during withdrawal of the raw compact from the die forming a conductive portion, wherein the irradiation step is performed on at least part of a surface of the raw compact to remove at least part of the conductive portion, the surface being a surface that has come into sliding contact with the die, and wherein a wavelength of the laser is in a wavelength absorption range of the soft magnetic particles.

4. A method for producing a compact by using coated soft magnetic powder that includes a plurality of coated soft magnetic particles constituted by soft magnetic particles and insulating coatings coating outer peripheries of the soft magnetic particles, the method comprising:

a raw material preparation step of preparing a raw compact by press-forming the coated soft magnetic powder in a die;

a raw compact withdrawal step of withdrawing the raw compact from the die after it that has been press-formed; and an irradiation step of irradiating at least part of a surface of the raw compact with a laser, wherein the laser is one type of laser selected from a YAG laser, a $YVO_4$ laser, and a fiber laser, wherein the raw compact withdrawal step causes a surface of the raw compact to come into sliding contact with the die during withdrawal of the raw compact from the die forming a conductive portion, wherein the irradiation step is performed on at least part of a surface of the raw compact to remove at least part of the conductive portion, the surface being a surface that has come into sliding contact with the die, and wherein, when an average output of the laser is P (W) and an irradiation area of the laser is S ($mm^2$), an energy density U ($W/mm^2$)=P/S of the laser satisfies $37.0 \leq U \leq 450.0$.

5. A method for producing a compact by using coated soft magnetic powder that includes a plurality of coated soft magnetic particles constituted by soft magnetic particles and insulating coatings coating outer peripheries of the soft magnetic particles, the method comprising:

a raw material preparation step of preparing a raw compact by press-forming the coated soft magnetic powder in a die;

a raw compact withdrawal step of withdrawing the raw compact from the die after it that has been press-formed; and an irradiation step of irradiating at least part of a surface of the raw compact with a laser, wherein the laser is one type of laser selected from a YAG laser, a $YVO_4$ laser, and a fiber laser, wherein the raw compact withdrawal step causes a surface of the raw compact to come into sliding contact with the die during withdrawal of the raw compact from the die forming a conductive portion, wherein the irradiation step is performed on at least part of a surface of the raw compact to remove at least part of the conductive portion, the surface being a surface that has come into sliding contact with the die, and wherein a ratio of an irradiation interval to a beam diameter of the laser is 0.35 or less.

6. A method for producing a compact by using coated soft magnetic powder that includes a plurality of coated soft magnetic particles constituted by soft magnetic particles and insulating coatings coating outer peripheries of the soft magnetic particles, the method comprising:

a raw material preparation step of preparing a raw compact by press-forming the coated soft magnetic powder in a die;

a raw compact withdrawal step of withdrawing the raw compact from the die after it that has been press-formed; and an irradiation step of irradiating at least part of a surface of the raw compact with a laser, wherein the laser is one type of laser selected from a YAG laser, a $YVO_4$ laser, and a fiber laser, wherein the raw compact withdrawal step causes a surface of the raw compact to come into sliding contact with the die during withdrawal of the raw compact from the die forming a conductive portion, wherein the irradiation step is performed on at least part of a surface of the raw compact to remove at least part of the conductive portion, the surface being a surface that has come into sliding contact with the die, and wherein a number of times of laser overlap is 5 or more.

7. A compact produced by the method for producing a compact according to claim 1.

* * * * *